United States Patent [19]

Terayama et al.

[11] Patent Number: 5,220,151

[45] Date of Patent: Jun. 15, 1993

[54] POWER SOURCE APPARATUS FOR AN ALTERNATING-CURRENT ARC WELDING CAPABLE OF SUPPLYING AN ALTERNATING-CURRENT WELDING CURRENT HAVING ANY WAVEFORM

[75] Inventors: Kikuo Terayama, Ikeda; Hirokazu Ioroi, Setsu; Narumi Fukumoto, Osaka; Hiroyuki Ishii, Takatsuki, all of Japan

[73] Assignee: Daihen Corporation, Japan

[21] Appl. No.: 635,855

[22] Filed: Dec. 28, 1990

[30] Foreign Application Priority Data

Dec. 28, 1989 [JP] Japan ................................. 1-343572
Apr. 28, 1990 [JP] Japan ................................. 2-113249

[51] Int. Cl.⁵ .............................................. B23K 9/10
[52] U.S. Cl. ............................. 219/130.32; 219/130.51
[58] Field of Search ................... 219/130.31, 130.32, 219/130.33, 130.51, 137 PS

[56] References Cited

U.S. PATENT DOCUMENTS

| Re. 31,544 | 3/1984 | Hedberg . | |
|---|---|---|---|
| 3,300,683 | 1/1967 | Weishaar | 219/137 PS |
| 4,048,468 | 9/1977 | Maule . | |
| 4,117,303 | 9/1978 | Hedberg . | |
| 4,159,409 | 6/1979 | Hedberg . | |
| 4,382,171 | 5/1983 | Hedberg . | |
| 4,521,671 | 6/1985 | Fronius . | |
| 4,521,672 | 6/1985 | Fronius . | |
| 4,564,742 | 1/1986 | Karlsson . | |
| 4,876,433 | 10/1989 | Kashima et al. . | |

FOREIGN PATENT DOCUMENTS

| 0072683 | 2/1983 | European Pat. Off. . | |
|---|---|---|---|
| 1-186279 | 7/1989 | Japan | 219/127 PS |
| 2165376 | 4/1986 | United Kingdom . | |

Primary Examiner—Clifford C. Shaw
Attorney, Agent, or Firm—Scully, Scott, Murphy & Presser

[57] ABSTRACT

There is disclosed a power source apparatus for an alternating-current arc welding. In the power source apparatus, a reference signal generator periodically generates a reference signal having a predetermined waveform, and a direct-current power source outputs a current periodically changing in response to the reference signal, the outputted current having a waveform corresponding to that of the reference signal. Thereafter, a switching circuit supplies an alternating-current welding current to a welding load so as to sequentially change the polarity of the welding current from a straight polarity to a reverse polarity and from the reverse polarity to the straight polarity in synchronization with the reference signal by switching the current outputted from the power source in response to the reference signal.

16 Claims, 20 Drawing Sheets

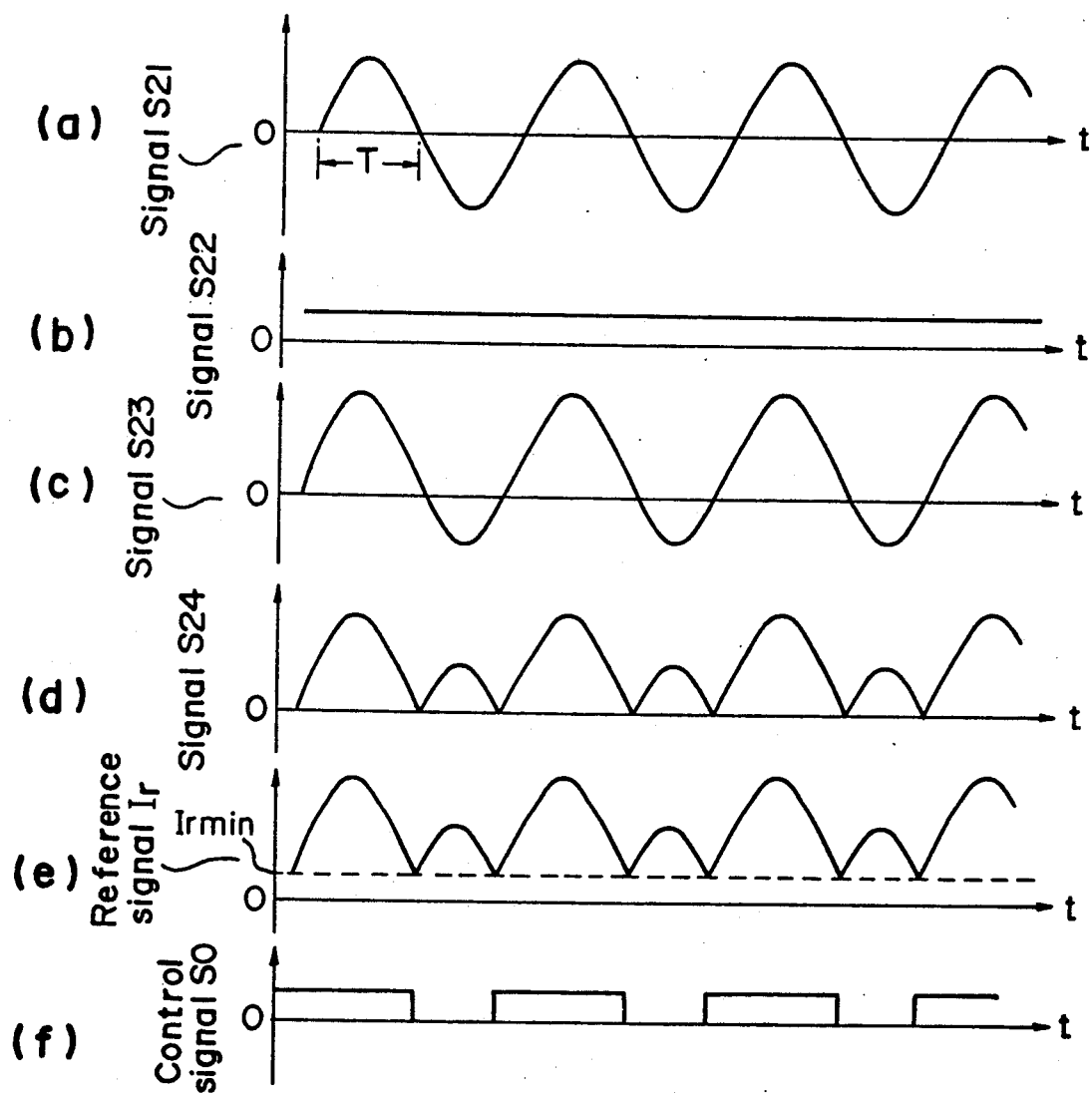

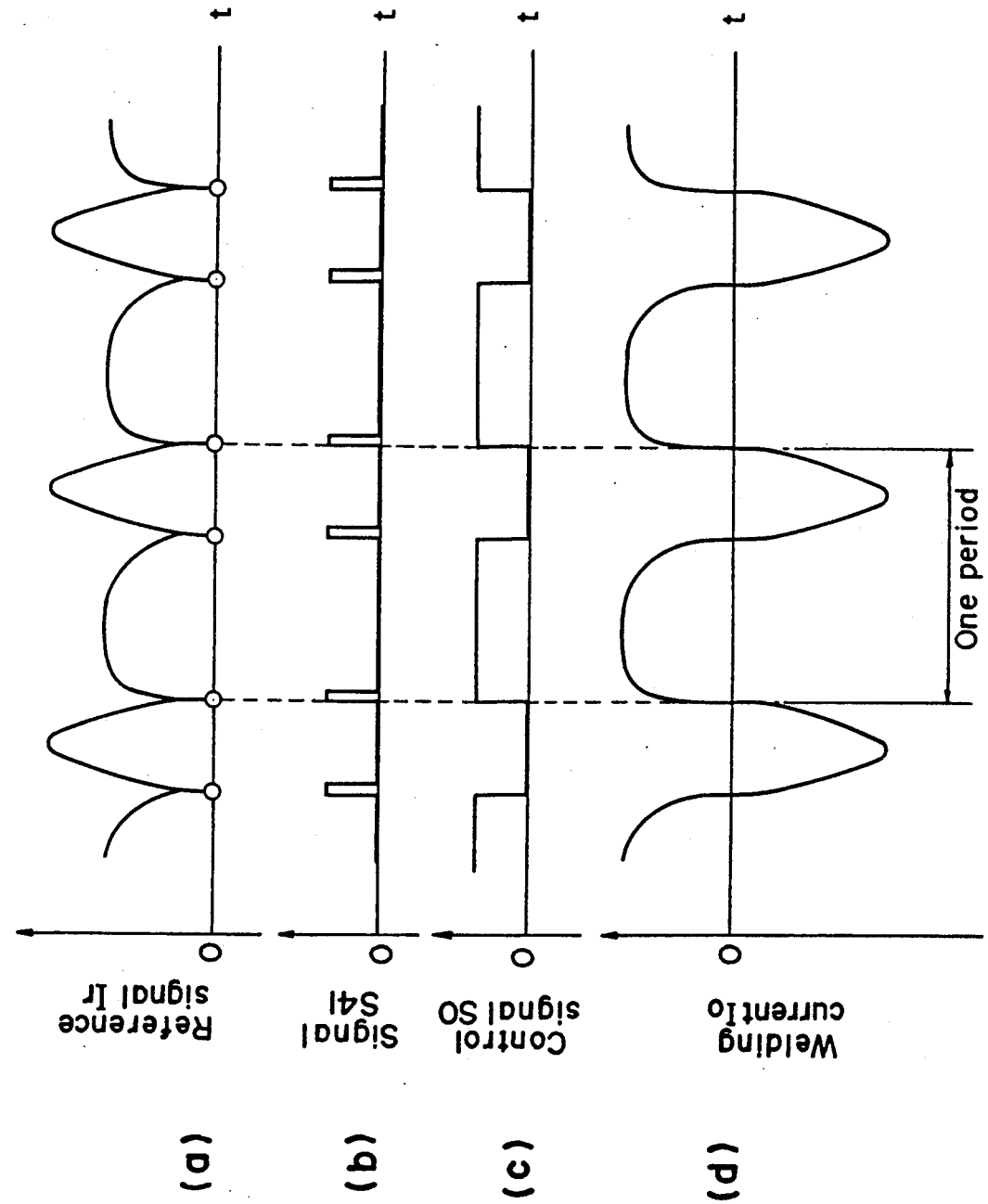

POWER SOURCE APPARATUS FOR AN ALTERNATING-CURRENT ARC WELDING CAPABLE OF SUPPLYING AN ALTERNATING-CURRENT WELDING CURRENT HAVING ANY WAVEFORM

BACKGROUND OF THE INVENTION

1. Field of the Invention

The present invention relates to a power source apparatus for an alternating-current arc welding, and more particularly, to a power source apparatus for an alternating-current arc welding which supplies an alternating-current welding current having any waveform to a load of the alternating-current arc welding by switching a current outputted from a direct-current power source.

2. Description of the Related Art

FIG. 15 shows a power source for an alternating-current arc welding which supplies an alternating-current welding current to a welding load of the alternating-current arc welding by switching an output current outputted from a direct-current power source using a switching device.

Referring to FIG. 15, a direct-current power source 101 generates a predetermined output of an alternating-current power source 102, and there is provided a switching circuit comprising switching transistors 103a to 103d and diodes 104a to 104d. The switching transistors 103a to 103d are electrically connected in a bridge form to each other, and the diodes 104a to 104d are electrically connected in parallel to respective transistors 103a to 103d, respectively, so that the conducting direction of each of the diodes 104a to 104b becomes opposite to that of each of the transistors 103a to 103d. A welding electrode 105 for an alternating-current arc welding and a work 106 are connected to the direct-current power source 101 through the switching circuit Further, there is provided a polarity switching controller 107 for controlling a pair of transistors 103a and 103b and a pair of transistors 103c and 103d so as to alternately turn on and off a pair of transistors 103a and 103b and a pair of transistors 103c and 103d.

Furthermore, there is provided a welding current setting circuit 108 for generating a reference signal Ir corresponding to a set welding current and outputting it to an error amplifier 110, and a welding current detector 109 for detecting a welding current Io flowing between the work 106 and the switching circuit and outputting a detection signal If corresponding to the welding current Io. The error amplifier 110 subtracts the detection signal If from the reference signal Ir and outputs a difference signal $\Delta I = Ir - If$ between the signals Ir and If to a direct-current power source controller 111, which controls the output voltage outputted from the direct-current power source 101 according to the difference signal $\Delta I$.

In the feed back system as described above, the reference signal Ir outputted from the welding current setting circuit 108 is compared with the detection signal If outputted from the welding current detector 109, and then, the controller 111 controls the output voltage outputted from the direct-current power source 101 in such a direction that the difference signal $\Delta I$ decreases toward zero so as to keep a constant output voltage outputted from the direct-current power source 101, namely, so that the welding current Io corresponds to the reference signal Ir.

On the other hand, control signals S1 and S2 are alternately supplied to either a pair of transistors 103a and 103b or a pair of transistors 103c and 103d, so that a pair of transistors 103a and 103b is turned on while a pair of transistors 103c and 103d is turned off for a time interval, and a pair of transistors 103a and 103b is turned off while a pair of transistors 103c and 103d is turned on for another time interval. When a pair of transistors 103a and 103b is turned on in response to the control signal S1, a welding current Isp having a straight polarity flows in a direction from the work 106 toward the welding electrode 105. On the other hand, when a pair of transistors 103c and 103d is turned on in response to the control signal S2, a welding current Irp having a reverse polarity flows in a direction from the welding electrode 105 toward the work 106.

FIG. 16 is a timing chart of the control signals S1 and S2 and the welding current Io.

Referring to FIG. 16, the welding current Io becomes an alternating-current of a rectangular pulse wave changing according to turning on and off of the control signals S1 and S2.

Since there is obtained a welding current of a rectangular pulse wave as described above, the welding current Io steeply changes upon switching the polarity of the voltage supplied to the welding electrode 105 and the work 106, and then, there is such an advantage that it becomes easy to perform refiring of the arc which has been extinguished once. However, since the output voltage applied to the welding electrode 105 and the work 106 becomes substantially a complete rectangular pulse wave, the arc is extinguished rapidly and the arc is reproduced rapidly upon switching the polarity, and also the change in the welding current Io is relatively large. Therefore, a large arc sounds so that an extremely large noise occurs, resulting in deterioration in the working environment. Further, since the welding current Io changes rapidly, the arc force changes rapidly. Therefore, a molten metal of the work 106 vibrates violently, and then, it is difficult for the above-mentioned power source to be applied to a precise welding.

SUMMARY OF THE INVENTION

An essential object of the present invention is to provide a power source apparatus for an alternating-current arc welding capable of supplying an alternating-current welding current having any waveform to a welding load without any large noise upon performing the alternating-current arc welding.

Another object of the present invention is to provide a power source apparatus for an alternating-current arc welding capable of supplying an alternating-current welding current having any waveform to a welding load without any vibration of the molten metal of the work upon performing the alternating-current arc welding.

A further object of the present invention is to provide a power source apparatus for an alternating-current arc welding which is applicable to a precise alternating-current arc welding.

In order to accomplish the above objects, according to one aspect of the present invention, there is provided a power source apparatus for an alternating-current arc welding comprising:

reference signal generating means for periodically generating a reference signal having a predetermined waveform;

direct-current power source means for outputting a current periodically changing in response to said reference signal, said outputted current having a waveform corresponding to that of said reference signal; and switching means for supplying an alternating-current welding current to a welding load so as to sequentially change the polarity of said welding current from a straight polarity to a reverse polarity and from the reverse polarity to the straight polarity in synchronization with said reference signal by switching said current outputted from said power source in response to said reference signal.

According to another aspect of the present invention, the above-mentioned power source apparatus further comprises:

current detecting means for detecting said welding current to be supplied to said welding load and outputting a detection signal corresponding to said detected welding current; and difference signal generating means for generating a difference signal corresponding to a difference between said reference signal and said detection signal, wherein said direct-current power source means outputs said current periodically changing in response to said difference signal.

According to a further aspect of the present invention, in the above-mentioned power source apparatus, said reference signal of one period outputted from said signal generating means is composed of a first signal for a first time interval and a second signal for a second time interval which are continuously outputted, said first signal gradually increases at the beginning of said first time interval and said first signal gradually decreases at the end of said first time interval, and said second signal gradually increases at the beginning of said second time interval and said second signal gradually decreases at the end of said second time interval.

According to a still further aspect of the present invention, in the above-mentioned power source apparatus, said direct-current power source means comprises:

first rectifying means for rectifying an alternating-current outputted from an external alternating-current power source;

a pulse width modulator for generating control signals, each control signal having a width modulated in response to said reference signal;

a high frequency invertor for converting the output of said first rectifying means into a high frequency alternating-current in response to said control signal generated by said pulse width modulator;

a transformer for converting the high frequency alternating-current voltage outputted from said high frequency invertor into a predetermined voltage suitable for said alternating-current arc welding; and second rectifying means for rectifying said voltage outputted from said transformer and said rectified voltage to said switching means.

According to a still more further aspect of the present invention, in the above-mentioned power source apparatus, said reference signal generating means comprises:

a bipolar signal generator for generating a bipolar signal periodically changing, said bipolar signal having a predetermined waveform;

a direct-current signal generator for generating a variable direct-current signal having either a positive polarity or a negative polarity, said direct-current signal generator including an adjusting device for adjusting the level of said variable direct-current signal so as to adjust a ratio of a time interval of a straight polarity of said welding current to that of a reverse polarity thereof;

an adder for adding said bipolar signal generated by said bipolar signal generator and said direct-current signal outputted from said direct-current signal generator, and outputting a signal of said addition result; and a rectifier circuit for full-wave rectifying said signal outputted from said adder and outputting a direct-current periodically changing as said reference signal.

According to a still further aspect of the present invention, in the above-mentioned power source apparatus, said reference signal generating means comprises:

a bipolar signal generator for generating a bipolar signal periodically changing, said bipolar signal having a predetermined waveform;

a first direct-current signal generator for generating a variable direct-current signal having either a positive polarity or a negative polarity, said first direct-current signal generator including an adjusting device for adjusting the level of said variable direct-current signal so as to adjust a ratio of a time interval of a straight polarity of said welding current to that of a reverse polarity thereof;

a first adder for adding said bipolar signal generated by said bipolar signal generator and said direct-current signal outputted from said direct-current signal generator, and outputting a signal of said addition result;

a rectifier circuit for full-wave rectifying said signal outputted from said first adder;

a second direct-current signal generator for generating a variable direct-current signal said second direct-current signal generator including an adjusting device for adjusting the level of said variable direct-current signal so as to adjust the minimum value of said welding current; and a second adder for adding said full-wave rectified signal outputted from said rectifier circuit and said direct-current signal outputted from said second direct-current signal generator, and outputting a direct-current periodically changing as said reference signal.

According to a more still further aspect of the present invention, in the above-mentioned power source apparatus, said reference signal generating means comprises:

a bipolar signal generator for generating a bipolar signal periodically changing, said bipolar signal having a predetermined waveform;

the positive signal of a first amplifier for amplifying said bipolar signal generated by said bipolar signal generator with a variable gain, said first amplifier including an adjusting device for adjusting said gain thereof;

the negative signal of a second amplifier for amplifying said bipolar signal outputted from said bipolar signal generator with a variable gain, said second amplifier including another adjusting device for adjusting said gain thereof; and a third amplifier for adding the outputs of said first and second amplifiers with the same polarities as each other, amplifying said added signal and outputting an amplified signal as the reference signal, and a ratio of a time interval of a straight polarity of said welding current to that of a reverse polarity thereof is adjusted by adjusting said gains of said first and second amplifiers using said adjusting devices.

According to a still further aspect of the present invention, in the above-mentioned power source apparatus, said reference signal generating means comprises:

a bipolar signal generator for generating a bipolar signal periodically changing, said bipolar signal having a predetermined waveform;

the positive signal of a first amplifier for amplifying said bipolar signal generated by said bipolar signal generator with a variable gain, said first amplifier including an adjusting device for adjusting said gain thereof;

the negative signal of after amplifying a second amplifier for amplifying said bipolar signal outputted from said bipolar signal generator with a variable gain, said second amplifier including another adjusting device for adjusting said gain thereof;

a direct-current signal generator for generating a variable direct-current signal, said direct-current signal generator including an adjusting device for adjusting the level of said variable direct-current signal so as to adjust the minimum value of said welding current; and a third amplifier for adding the outputs of said first and second amplifiers and said direct-current signal generator with the same polarities as each other, amplifying said added signal and outputting an amplified signal as the reference signal, and a ratio of a time interval of a straight polarity of said welding current to that of a reverse polarity thereof is adjusted by adjusting said gains of said first and second amplifiers using said adjusting devices.

According to a still another aspect of the present invention, in the above-mentioned power source apparatus, said reference signal generating means comprises:

a periodic signal generator for generating a periodic signal periodically changing, said periodic signal having a predetermined waveform; and an amplifier for amplifying said periodic signal generated by said periodic signal generator with a gain of:

(an average value of a rectangular wave signal when the waveform of said periodic signal is the rectangular wave signal)/(an average value of a periodic signal of any waveform having a peak value which is equal to the instantaneous value of the rectangular wave signal), and outputting the amplified signal as the reference signal.

According to a still more another aspect of the present invention, in the above-mentioned power source apparatus, said reference signal generating means comprises:

a periodic signal generator for generating a periodic signal periodically changing, said periodic signal having a predetermined waveform; and an amplifier for amplifying said periodic signal generated by said periodic signal generator with a gain of:

(an effective value of a rectangular wave signal when the waveform of said periodic signal is the rectangular wave signal)/(an effective value of a periodic signal of any waveform having a peak value which is equal to the instantaneous value of the rectangular wave signal), and outputting the amplified signal as the reference signal.

According to a more still another aspect of the present invention, in the above-mentioned power source apparatus, said reference signal generating means comprises:

a current detecting circuit for detecting an average value of said welding current to be supplied to said welding load and outputting a detection signal corresponding to said detected average value thereof;

a current setting means for setting an average value of a welding current to be set and outputting a setting signal corresponding to said average value thereof;

an error amplifier for subtracting said setting signal outputted from said current setting means, from said detection signal outputted from said current detecting circuit, and outputting a difference signal corresponding to a difference between these signals; and a signal generator for generating a periodic signal periodically changing, said periodic signal having a predetermined waveform and a peak value determined by said difference signal outputted from said error amplifier.

According to the other aspect of the present invention, in the above-mentioned power source apparatus, said reference signal generating means comprises:

a current detecting circuit for detecting an effective value of said welding current to be supplied to said welding load and outputting a detection signal corresponding to said detected effective value thereof;

a current setting means for setting an effective value of a welding current to be set and outputting a setting signal corresponding to said effective value thereof;

an error amplifier for subtracting said setting signal outputted from said current setting means, from said detection signal outputted from said current detecting circuit, and outputting a difference signal corresponding to a difference between these signals; and a signal generator for generating a periodic signal periodically changing, said periodic signal having a predetermined waveform and a peak value determined by said difference signal outputted from said error amplifier.

According to still the other aspect of the present invention, in the above-mentioned power source apparatus, said reference signal generating means comprises:

storage means for storing a group of digital data of said reference signal;

reading means for reading a group of said digital data stored by said storage means sequentially in a predetermined order with a predetermined speed, repeatedly, a time interval from the beginning of reading a group of said digital data to the end thereof corresponding to one period of said welding current to be supplied to said welding load;

converting means for converting said digital data read by said reading means into an analogue signal; and low-pass filter means for rejecting a high frequency component of said analogue signal outputted from said converting means and outputting a filtered analogue signal as the reference signal to said direct-current power source means.

In the power source for the alternating-current arc welding according to the present invention, since the waveform of the welding current can be obtained so that the welding current decreases gradually before and after switching the polarity of the welding current, a noise caused upon extinguishment and reproduction of an alternating-current arc can be lowered, and then, the working environment can be prevented from deteriorating.

Since the polarity of the welding current is switched gradually, the change in the arc force can be lowered, resulting in not only decrease in occurrence of spatters but also decrease in vibration of the molten metal of the work. Accordingly, an alternating-current arc welding of good quality can be performed.

BRIEF DESCRIPTION OF THE DRAWINGS

These and other objects and features of the present invention will become clear from the following description taken in conjunction with the preferred embodiments thereof with reference to the accompanying drawings, in which:

FIG. 4b is a timing chart of respective signals S21 to S24, a reference signal Ir and a control signal S0 shown in FIG. 4a;

FIG. 5b is a timing chart of respective signals S31 to S33 and a reference signal Ir shown in FIG. 5a;

FIG. 12b is a timing chart of a reference signal Ir, a polarity switching control signal S0 and a welding current Io shown in FIG. 12a;

FIG. 12c is a timing chart of a reference signal Ir, a polarity switching control signal S0 and a welding current Io in a modification of the reference signal generator 8i shown in FIG. 12a;

FIG. 13b is a timing chart of a reference signal Ir, a signal S41, a polarity switching control signal S0 and a welding current Io shown in FIG. 13a;

FIG. 14b is a timing chart of a reference signal Ir, respective signals S51 to S53, a control signal S0 and a welding current Io shown in FIG. 14a;

DETAILED DESCRIPTION OF THE PREFERRED EMBODIMENTS

Preferred embodiments according to the present invention will be described below with reference to the attached drawings.

Power source of First preferred embodiment

Figure 1:
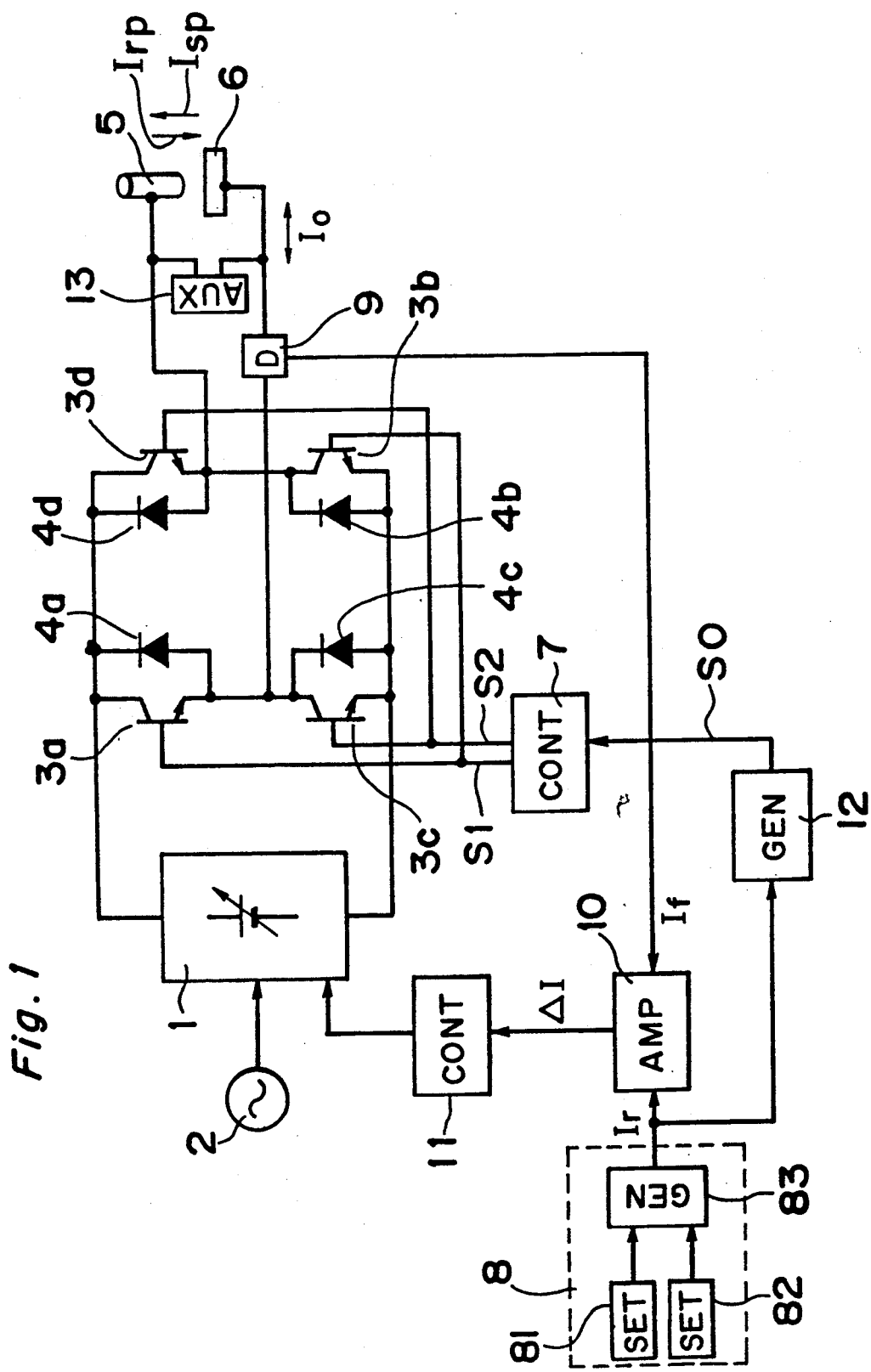
FIG. 1 is a schematic block diagram showing a power source for an alternating-current arc welding of a first preferred embodiment according to the present invention.

FIG. 1 is a schematic block diagram showing a power source for an alternating-current arc welding of a first preferred embodiment according to the present invention.

Referring to FIG. 1, a direct-current power source 1 including a direct-current voltage source generates a predetermined direct-current output voltage from an alternating-current voltage outputted from an alternating-current power source 2 such as a commercial alternating-current source, and there is provided a switching circuit comprising switching transistors 3a to 3d and diodes 4a to 4d. The switching transistors 3a to 3d are electrically connected in a bridge form to each other. Namely, both the collectors of the transistors 3a and 3d are connected to a positive output terminal of the direct-current power source 1, and both the emitters of the transistors 3c and 3b are connected to a negative output terminal of the direct-current power source 1. The emitter of the transistor 3a is connected to the collector of the transistor 3c, and the emitter of the transistor 3d is connected to the collector of the transistor 3b. The diodes 4a to 4d are electrically connected in parallel to the transistors 3a to 3d, respectively, so that the conducting direction of each of the diodes 4a to 4b becomes opposite to that of each of the transistors 3a to 3d.

A welding electrode 5 for an welding alternating-current arc welding and a work 6 are connected to the direct-current power source 1 through the switching circuit. Namely, the emitter of the transistor 3d and the collector of the transistor 3b are connected to the welding electrode 5, and the emitter of the transistor 3a and the collector of the transistor 3c are connected to the work 6 through a welding current detector 9 for detecting an alternating-current welding current Io flowing between the welding electrode 5 and the work 6 and outputting to an error amplifier 10 a detection signal If corresponding to an instantaneous value of the welding current Io to be supplied to the welding electrode 5 and the work 6.

Further, there is provided a switching controller 7 for controlling a pair of transistors 3a and 3b and a pair of transistors 3c and 3d by alternately outputting control signals S1 and S2 according to a control signal S0 outputted from a control signal generator 12, so as to alternately turn on and off a pair of transistors 3a and 3b and a pair of transistors 3c and 3d. It is to be noted that the control signal S1 is applied to respective bases of the transistors 3a and 3b, and the control signal S2 is applied to respective bases of the transistors 3c and 3d.

Furthermore, there is provided a reference signal generator 8 for generating a reference signal Ir corresponding to a set welding current and outputting it to the error amplifier 10 and the control signal generator 12, wherein the reference signal generator 8 comprises a welding current setting circuit 81 for setting a welding current Io and outputting a signal corresponding to the set welding current to a signal generator 83, a time interval setting circuit 82 for setting a time interval of the straight polarity of the welding current Io and a time interval of the reverse polarity thereof and outputting signals corresponding to the set time intervals to the signal generator 83, and the signal generator 83 for generating a reference signal Ir in response to the signals outputted from the setting circuits 81 and 82.

The error amplifier 10 subtracts the detection signal If from the reference signal Ir and outputs a difference signal $\Delta I = Ir - If$ to a direct-current power source controller 11. The control signal generator 12 generates a control signal S0 synchronizing to a pulsating period of the reference signal Ir in response to the reference signal Ir, and outputs it to the switching controller 7. It is to be noted that the control signal S0 becomes a timing signal for generating the control signals S1 and S2 in the switching controller 7.

Further, there is preferably provided an auxiliary circuit 13 for applying a relatively high voltage in synchronization to switching the polarity of the output voltage to be applied to the welding electrode 5 and the work 6 in order to enable refiring of the arc which has been extinguished once upon switching the polarity of the output voltage to be applied to the welding load circuit. The auxiliary circuit 13 is electrically connected between the welding electrode 5 and the work 6.

In the power source of the first preferred embodiment shown in FIG. 1, the reference signal Ir outputted from the reference signal generator 8 becomes a minimum value Irmin at timings of the beginning and the end of each of a time interval Tsp of the straight polarity and a time interval Trp of the reverse polarity, and the reference signal Ir becomes a maximum value Irmax at a middle timing of each of the time interval Tsp of the straight polarity and the time interval Trp of the reverse polarity.

In the power source of the first preferred embodiment shown in FIG. 1, when an alternating-current which changes periodically is applied from the power source of the preferred embodiment to a welding load circuit including the welding electrode 5 and the work 6, an alternating-current welding current Io which periodically changes corresponding to the alternating-current voltage flows in the welding load circuit.

Figure 2:
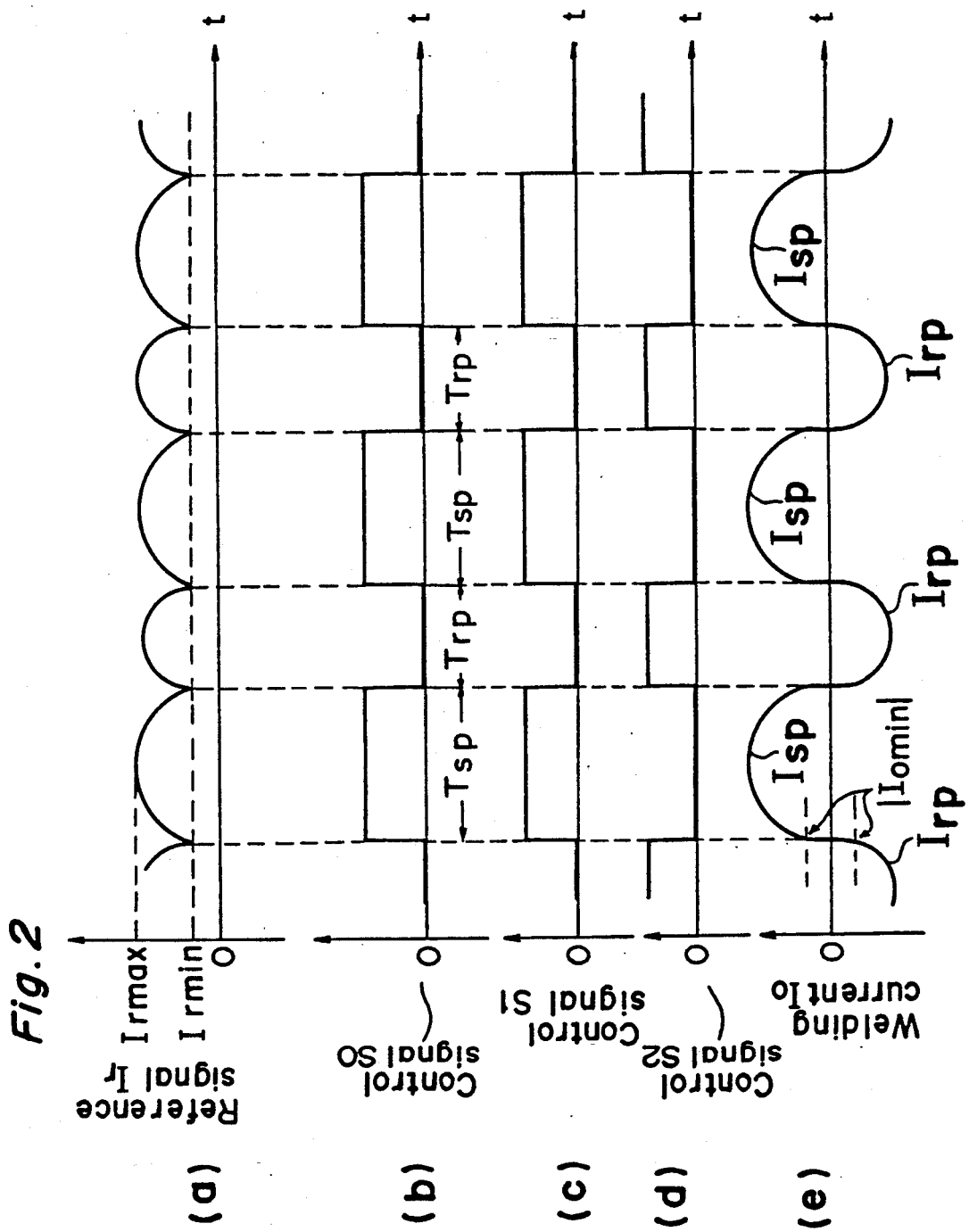
FIG. 2 is a timing chart showing a reference signal Ir, control signals S0, S1 and S2 and a welding current Io shown in FIG. 1.

FIG. 2 is a timing chart showing the reference signal Ir outputted form the reference signal generator 8, the control signal S0 outputted from the control signal generator 12, the control signals S1 and S2 outputted from the switching controller 7, and the welding current Io.

As is apparent from FIG. 2, when a reference signal Ir is determined, the output current outputted from the direct-current power source 1 is determined in response to the reference signal Ir. Then, the welding current Io has a current waveform corresponding to the reference signal Ir periodically changing between the maximum value Irmax and the minimum value Irmin, and the switching controller 7 generates the control signals S1 and S2, alternately, in synchronization to a period of the minimum value Irmin of the welding current Io which changes periodically. Therefore, as shown in FIG. 2, the welding current Io becomes an alternating-current whose polarity is inverted at timings of the minimum welding current |Iomin|.

Further, the reference signal Ir gradually increases at the beginning of the time interval of the straight polarity thereof and gradually decreases at the end thereof, and the reference signal Ir gradually increases at the beginning of the time interval of the reverse polarity thereof and gradually decreases at the end thereof. Since the welding current Io changes corresponding to the reference signal Ir as described above, the welding current Io gradually increases at the beginning of the time interval of the straight polarity thereof and gradually decreases at the end thereof, and also, the welding current Io gradually decreases at the beginning of the time interval of the reverse polarity thereof and gradually increases at the end thereof.

Accordingly, if the minimum value Irmin of the reference signal Ir at the timing when the polarity of the output voltage is reversed is properly predetermined, the above-mentioned rapid change in the arc voltage is prevented, and then, the noise decreases. Further, since the arc force changes gradually accompanying with this, the molten metal of the work 6 can be prevented from vibrating violently.

In the timing chart shown in FIG. 2, the maximum value of the reference signal Ir for the time interval Tsp is substantially the same as that for the time interval Trp. However, the present invention is not limited to this. The maximum value Irmax of the reference signal Ir for the time interval Tsp may be substantially different from that for the time interval Trp. Further, the waveform of the reference signal Ir for the time interval Tsp may be substantially different from that for the time interval Trp.

As the power source shown in FIG. 1, there may be used any direct-current power source capable of determining the output current according to the reference signal Ir, such as a power source for controlling a phase of an alternating-current outputted from an alternating-current power source using a thyristor so as to control the output current, or a power source for rectifying an alternating-current outputted from an alternating-current power source and adjusting the output current using analogue transistors or a chopper circuit. Further, there may be used a power source comprising a rectifier circuit for rectifying an alternating-current and outputting a direct-current, a high frequency invertor for converting the direct-current into a high frequency alternating-current, and another rectifier circuit for rectifying the high frequency alternating-current and outputting a direct-current.

Power source of Second preferred embodiment

Figure 3:
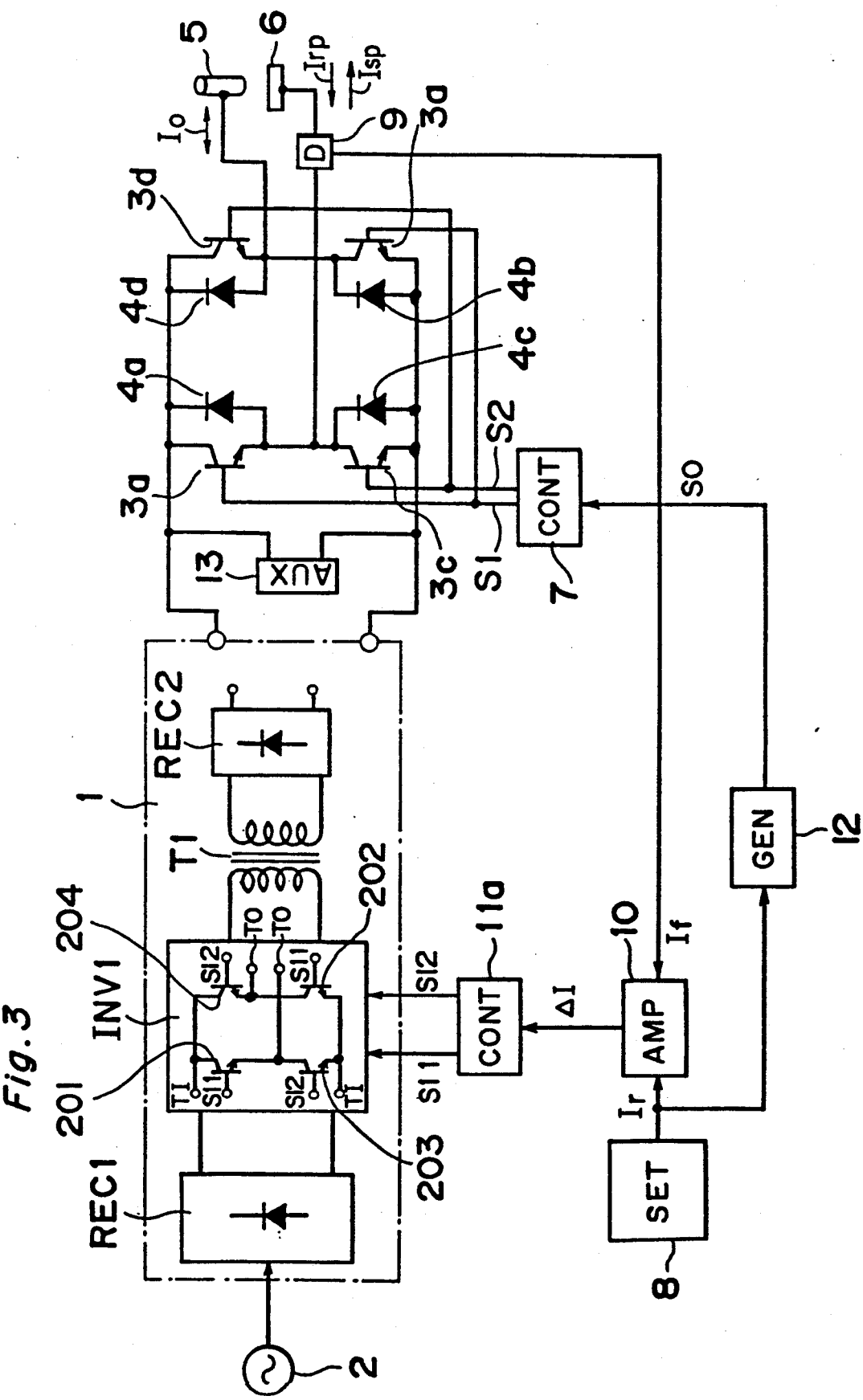
FIG. 3 is a schematic block diagram showing a power source for an alternating-current arc welding of a second preferred embodiment according to the present invention.

FIG. 3 is a schematic block diagram showing a power source for an alternating-current arc welding of a second preferred embodiment according to the present invention, wherein the power source is characterized in that a direct-current power source 1 comprises a high frequency invertor INV1. As is apparent from FIG. 3, the power source is constituted in a manner similar to that shown in FIG. 1, except for the direct-current power source 1.

The direct-current power source 1 comprises a first rectifier circuit REC1 for rectifying an alternating-current supplied from the alternating-current power source 2 such as a commercial power source, a high frequency invertor INV1 for converting the output current outputted from the rectifier circuit REC1 into a high frequency alternating-current, a transformer T1 for converting the high frequency alternating-current voltage outputted from the inverter INV1 into an alternating-current voltage suitable for an alternating-current arc welding, and a second rectifier circuit REC2 for rectifying the alternating-current outputted from the transformer T1 and outputting the rectified current to the above-mentioned switching circuit.

The invertor INV1 comprises four switching transistors 201 to 204 which are electrically connected in a bridge form. TI denotes input terminals of the invertors INV1 and TO denotes output terminals thereof. A pulse switching control signal S11 outputted from an invertor controller 11a is inputted to respective bases of the transistors 201 and 202, and a pulse switching control signal S12 outputted from the invertor controller 11a is inputted to respective bases of the transistors 203 and 204.

The output current outputted from the invertor INV1 is adjusted by the invertor controller 11a composed of a pulse width modulator for generating the pulse switching signals S11 and S12, each signal having a predetermined frequency and a pulse width which is modulated corresponding to the difference signal ΔI, in response to the difference signal ΔI outputted from the error amplifier 10. It is to be noted that the pulse width modulator of the invertor controller 11a is preferably constituted by a digital integrated circuit of model μPC494 manufactured by NEC Corp.. In the present preferred embodiment, the operation frequency of the invertor INV1 or the operation frequency of the invertor controller 11a is set so as to be sufficiently switching circuit composed of the transistors 3a to 3d. For example, if the above operation frequency thereof is set at a high frequency higher than 10 KHz, the reference signal Ir outputted from the reference signal generator 8 can be faithfully reproduced corresponding to the pulsating instantaneous value of the welding current Io which changes periodically.

Generally speaking, a hard oxide film is formed on a surface of the work 6 of a material such as an aluminium or the like. In order to remove the oxide film, it has been well known to those skilled in the art that a time interval of the reverse polarity while the welding electrode 5 has a potential of a positive polarity and the work 6 has a potential of a negative polarity has an important role. A range for removing the oxide film (referred to as a cleaning width hereinafter) is determined by an electric power which is supplied to the welding load circuit for the time interval of the reverse polarity. In order to set the cleaning width so as to be larger than a width of a produced bead by a value larger than a predetermined value, there is preferably adjusted the ratio of the electric power to be supplied thereto for the time interval of the reverse polarity to the whole welding electric power (referred to as an RP power ratio hereinafter).

Various kinds of reference signal generators 8a to 8k to be used for the power sources for the alternating-current arc welding shown in FIGS. 1 and 3 will be described below.

Reference signal generator 8a

Figure 4A:
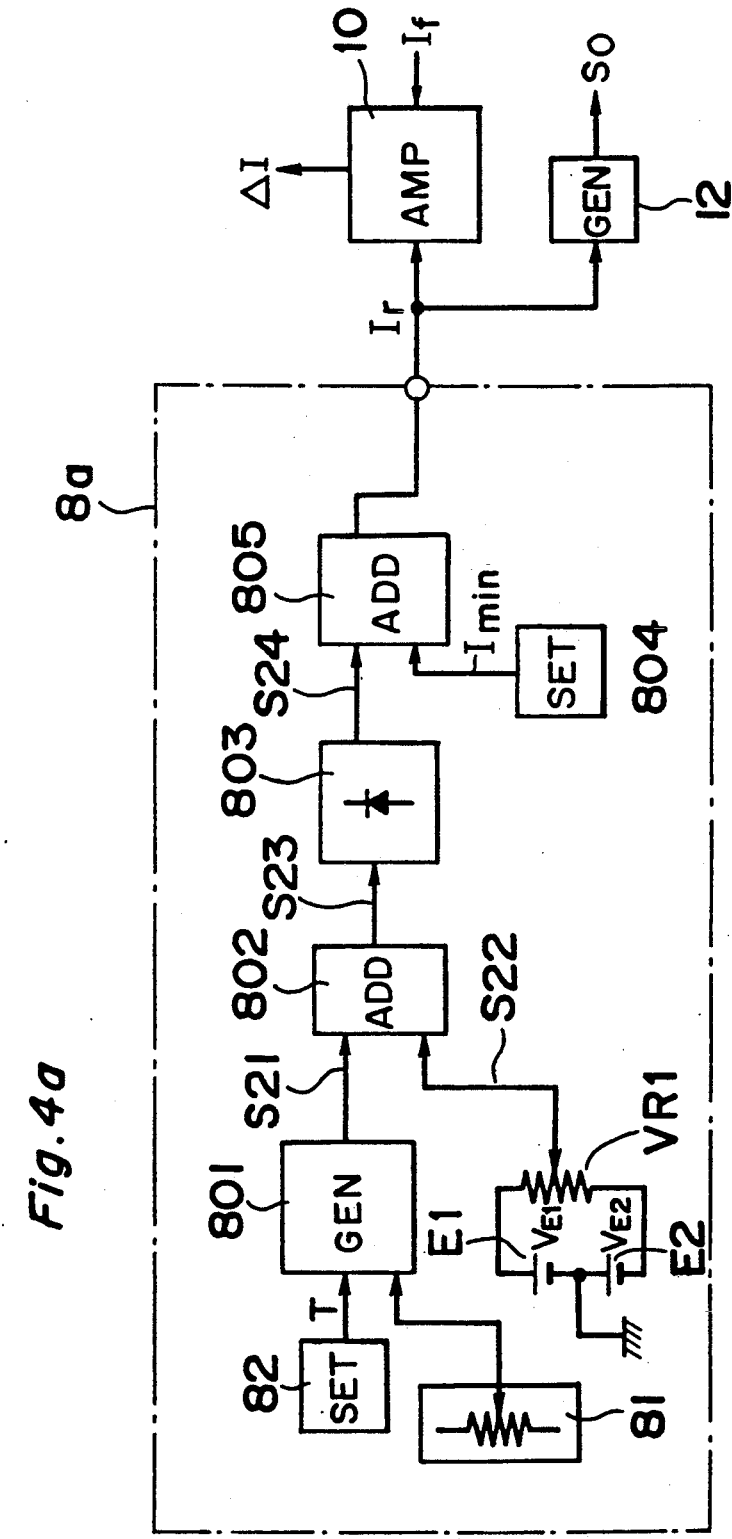
FIG. 4a is a schematic block diagram showing a reference signal generator 8a to be used for the power source of the preferred embodiments.

FIG. 4a is a schematic block diagram showing a reference signal generator 8a to be used for the power source of the preferred embodiments. The reference signal generator 8a is characterized in that the above-mentioned RP power ratio can be adjusted and the above-mentioned cleaning width can be adjusted. FIG. 4b is a timing chart of respective signals S21 to S24, a reference signal Ir and a control signal S0 shown in FIG. 4a.

Referring to FIG. 4a, a signal generator 801 generates a bipolar signal S21 of a predetermined waveform having a period T corresponding to a signal outputted from the period setting circuit 82 and a peak value predetermined by the welding current setting circuit 81 composed of a variable resistor, and outputs the bipolar signal S21 to a first input terminal of an adder 802.

On the other hand, direct-current power sources E1 and E2 for respectively outputting output voltages $V_{E1}$ and $V_{E2}$ are connected in series, and the connecting point between the negative output terminal of the power sources E1 and the positive output terminal of the power source E2 is connected to ground. Further, both ends of a variable resistor VR1 is connected between the positive output terminal of the power source E1 and the negative output terminal of the power source E2, and a sliding terminal of the variable resistor VR1 is connected to a second input terminal of the adder 802. A circuit composed of the direct-current power sources E1 and E2 and the variable resistor VR1 constitutes a direct-current power source for generating a direct-current voltage signal S22 variable between the voltage $+V_{E1}$ and the voltage $-V_{E2}$ which acts as an adjusting device for adjusting the ratio of the positive welding current to the negative welding current, such as an RP ratio. Therefore, the circuit composed of the direct-current power sources E1 and E2 and the variable resistor VR1 is referred to as an RP ratio adjusting device hereinafter.

The adder 802 adds the bipolar signal S21 outputted from the signal generator 801 and the direct-current voltage signal S22 outputted from the RP ratio adjusting device, and outputs to a full-wave rectifier circuit 803 an alternating-current voltage signal S23 of the addition result which is biased toward either the positive voltage side or the negative voltage side as shown in (c) of FIG. 4b. The full-wave rectifier circuit 803 rectifies the biased alternating-current signal S23, and outputs the rectified voltage to a first input terminal of an adder 805. A minimum welding current setting circuit 804 sets a minimum welding current Imin and outputs a signal corresponding to the minimum welding current Imin to a second input terminal of the adder 805. The adder 805 adds the rectified voltage outputted from the full-wave rectifier circuit 803 and the signal outputted from the minimum welding current setting circuit 804, and outputs the reference signal Ir of the addition result to the error amplifier 10 and the control signal generator 12.

In the reference signal generator 8a of the present preferred embodiment shown in FIG. 4a, the bipolar signal S21 outputted from the signal generator 801 is added to the direct-current voltage signal S22 outputted from the RP ratio adjusting device by the adder 802, and then, the added signal S23 is rectified by the full-wave rectifier circuit 803, resulting in a pulsating direct-current voltage signal S24, as shown in FIG. 4b.

Since the voltage signal S24 instantaneously includes zero, the welding current Io becomes too low at a timing of the voltage signal S24 of zero and in the vicinity thereof if the voltage signal S24 is used as the reference signal Ir. In this case, there is provided such a disadvantage that the alternating-current arc may be cut. In order to prevent the arc from being cut, a direct-current voltage signal corresponding to a minimum welding current Imin necessary for maintaining and reproducing the arc so that the arc can be prevented from being cut is applied to the adder 805 by the minimum welding current setting circuit 804, and then, there is obtained the reference signal Ir of the sum of the voltage signal S24 and the voltage signal outputted from the minimum welding current setting circuit 804.

On the other hand, the ratio of the positive peak value to the negative peak value of the reference signal Ir for setting the welding current Io can be altered by adjusting the variable resistor VR1. In order to adjust the ratio of the straight polarity of the peak value to the reverse polarity of the peak value of the reference signal Ir, there may be provided a gain-variable amplifier for amplifying the positive signal of the bipolar signal S21, another gain-variable amplifier for amplifying the negative signal of the bipolar signal S21, and an adder for adding the amplified signals outputted from both the amplifiers so that the amplified signals to be added have the same polarity, namely, after inverting one of the amplified signals. A reference signal generator 8b of this type will be described hereinafter.

Reference signal generator 8b

Figure 5A:
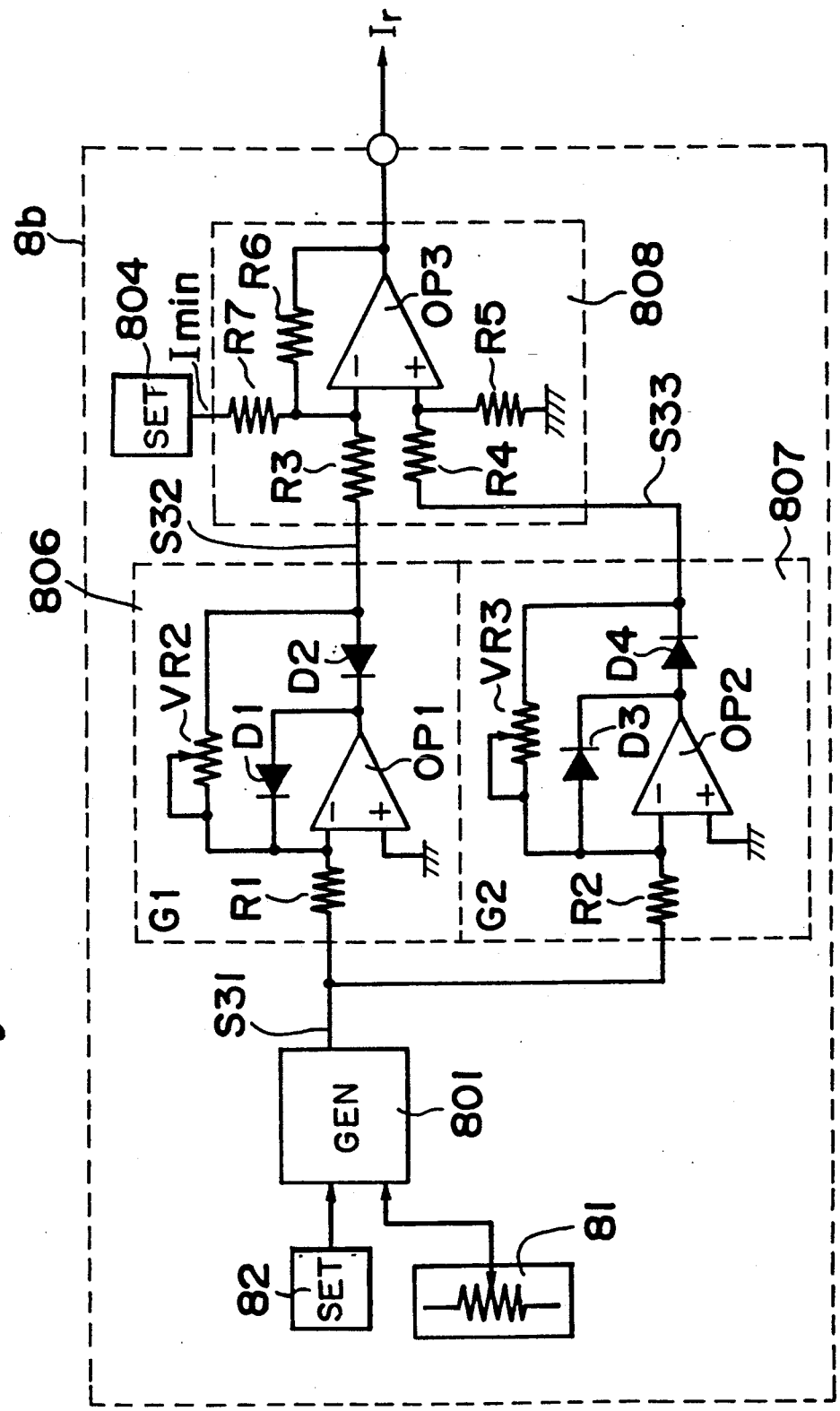
FIG. 5a is a schematic block diagram showing a reference signal generator 8b to be used for the power source of the preferred embodiments.
Figure 5B:
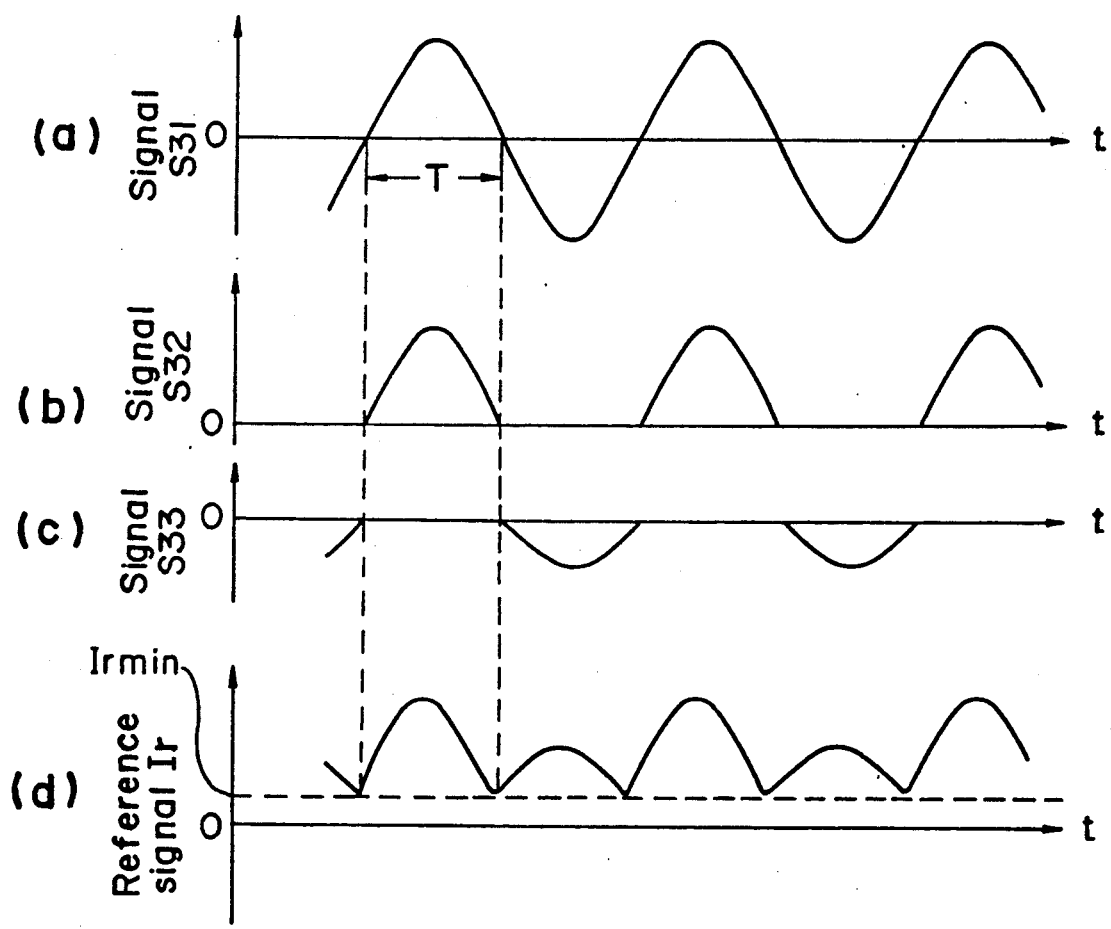

FIG. 5a is a schematic block diagram showing the reference signal generator 8b of this type to be used for the power source of the preferred embodiments, and FIG. 5b is a timing chart of respective signals S31 to S33 and the reference signal Ir shown in FIG. 5a.

Referring to FIG. 5a, the signal generator 801 generates a bipolar signal S31 having a period set by the period setting circuit 82 and a signal level set by the welding current setting circuit 81, and outputs the bipolar signal S31 to an inverted input terminal of an operational amplifier OP1 through an input resistor R1 and to an inverted input terminal of an operational amplifier OP2 through an input resistor R2.

An amplifier circuit 806 comprises the operational amplifier OP1 having a non-inverted input terminal connected to ground, the input resistor R1, a diode D1 connected between the inverted input terminal and the output terminal of the operational amplifier OP1, a diode D2 for clipping the positive amplified output signal thereof with the diode D1, and a variable resistor VR2 for adjusting a gain G1 of the amplifier circuit 806. An amplifier circuit 807 comprises the operational amplifier OP2 having a non-inverted input terminal connected to ground, the input resistor R2, a diode D3 connected between the inverted input terminal and the output terminal of the operational amplifier OP2, a diode D4 for clipping the negative amplified output signal with the diode D3, and a variable resistor VR3 for adjusting a gain G2 of the amplifier circuit 807. The positive signal of the bipolar signal S31 is amplified with a gain G1 by the amplifier circuit 806, and then, the amplified signal S32 is outputted to an inverted input terminal of an operational amplifier OP3 through an input resistor R3. On the other hand, the negative signal of the bipolar signal S31 is amplified with a gain G2 which is different from the gain G1 by the amplifier circuit 807, and then, the amplified signal S33 is outputted to a non-inverted input terminal of an operational amplifier OP3 through an input resistor R4.

An amplifier circuit 808 comprises the operational amplifier OP3, the input resistors R3 and R4, an input resistor R7, a resistor R5 connected between the non-inverted input terminal of the operational amplifier OP3 and ground, and a feed back resistor R6 connected between the inverted input terminal and the output terminal of the operational amplifier OP3. The amplifier circuit 808 adds and amplifies the amplified signals S32 and S33 and the signal corresponding to the minimum welding current Imin which is outputted from a minimum welding current setting circuit 804 so that all the signals to be added have the same polarities, and outputs the added and amplified signal as the reference signal Ir.

In the reference signal generator 8b shown in FIG. 5a, respective variable resistors VR2 and VR3 of the amplifier circuits 806 and 807 constitute an adjusting device for adjusting the ratio of the positive peak value to the negative peak value of the reference signal Ir. One of the variable resistors VR2 and VR3 may be set to a fixed resistor, and another thereof may be set to a semi-fixed resistor. Further, there may be provided a mechanism for interlocking the variable resistors VR2 and VR3 so as to simultaneously adjust both the variable resistors VR2 and VR3, respectively, in directions opposite to each other.

Generally speaking, the welding current Io is often represented by an average value or an effective value. On the other hand, the signal generator 801 generates a bipolar signal S31 having a peak level set by the welding current setting circuit 81. Therefore, there is preferably provided a reference signal generator for generating a signal having a peak value in response to data of a specified average value or a specified effective value. In the reference signal generator of this type, the level of the welding current can be specified by either an average value or an effective value. Also, even though the waveform of the welding current Io is altered, the same average or effective value as that of the waveform thereof before alteration can be obtained.

Reference signal generator 8c

Figure 6:
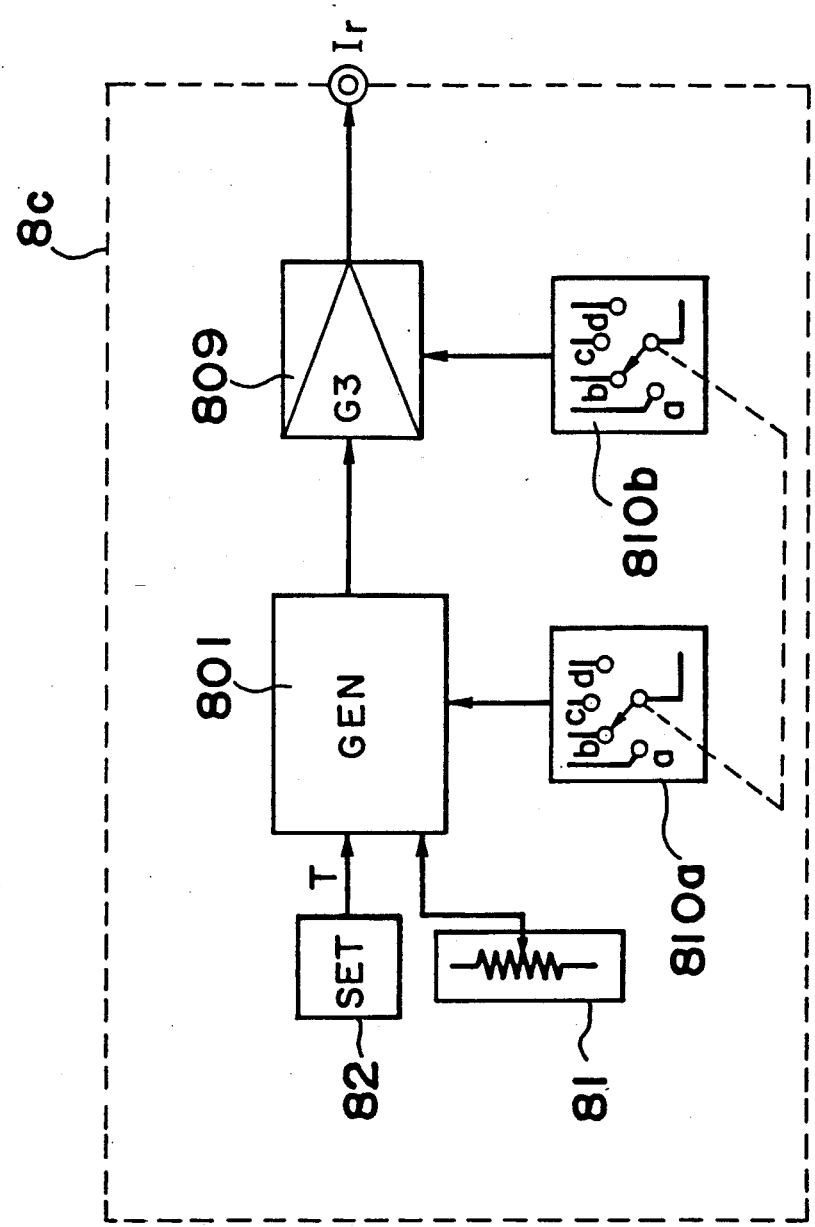
FIG. 6 is a schematic block diagram showing a reference signal generator 8c to be used for the power source of the preferred embodiments.

FIG. 6 is a schematic block diagram showing a reference signal generator 8c of this type to be used for the power source of the preferred embodiments.

Referring to FIG. 6, a signal generator 801 comprises a switch 810a for selecting one of signals having various kinds of waveforms, and generates a periodic signal having the selected waveform (referred to as a periodic signal hereinafter) and outputs it as the reference signal Ir through an amplifier 809 whose amplification factors can be altered or switched. The amplifier 809 comprises a switch 810b for selecting one of amplification factors G3, which is interlocked with the switch 810a.

In a first example of the present preferred embodiment, when the switch 810a is switched over to a-contact, the signal generator 801 generates a sine wave signal. When the switch 810a is switched over to b-contact, the signal generator 801 generates a triangular wave signal. When the switch 810a is switched over to c-contact, the signal generator 801 generates a rectangular wave signal. Further, when the switch 810b is switched over to a-contact, the amplification factor G3 of the amplifier 809 is set at $\pi/2$. When the switch 810b is switched over to b-contact, the amplification factor G3 of the amplifier 809 is set at two. When the switch 810b is switched over to c-contact, the amplification factor G3 of the amplifier 809 is set at one. In this case, when both the switches 810a and 810b are switched over to either a-contact, b-contact or c-contact interlocking them, the average value of the reference signal Ir does not change, resulting in no change in the average value of the welding current Io depending on the waveform thereof.

In a second example of the present preferred embodiment, when the switch 810a is switched over to a-contact, the signal generator 801 generates a sine wave signal. When the switch 810a is switched over to b-contact, the signal generator 801 generates a triangular wave signal. When the switch 810a is switched over to c-contact, the signal generator 801 generates a rectangular wave signal. Further, when the switch 810b is switched over to a-contact, the amplification factor G3 of the amplifier 809 is set at $\sqrt{2}$. When the switch 810b is switched over to b-contact, the amplification factor G3 of the amplifier 809 is set at $\sqrt{3}$. When the switch 810b is switched over to c-contact, the amplification factor G3 of the amplifier 809 is set at one. In this case, when both the switches 810a and 810b are switched over to either a-contact, b-contact or c-contact interlocking them, the effective value of the reference signal Ir does not change, resulting in no change in the effective value of the welding current Io depending on the waveform thereof.

Namely, in order not to change the average value of the reference signal Ir depending on various kinds of waveforms thereof, it is necessary to set the amplification factor G3 of the amplifier 809 when switching both the switches 810a and 810b interlocking them so that the amplification factor G3 thereof becomes:

(an average value of a rectangular wave signal when the waveform of the periodic signal is the rectangular wave signal)/(an average value of a periodic signal of any waveform having a peak value which is equal to the instantaneous value of the rectangular wave signal).

Then, there is no change in the average value in the welding current Io.

Furthermore, in order not to change the average value of the reference signal Ir depending on various kinds of waveforms thereof, it is necessary to set the amplification factor G3 of the amplifier 809 when switching both the switches 810a and 810b interlocking them so that the amplification factor G3 thereof becomes:

(an effective value of a rectangular wave signal when the waveform of the periodic signal is the rectangular wave signal)/(an effective value of a periodic signal of any waveform having a peak value which is equal to the instantaneous value of the rectangular wave signal).

Then, there is no change in the effective value of the welding current Io.

Reference signal generator 8d

Figure 7:
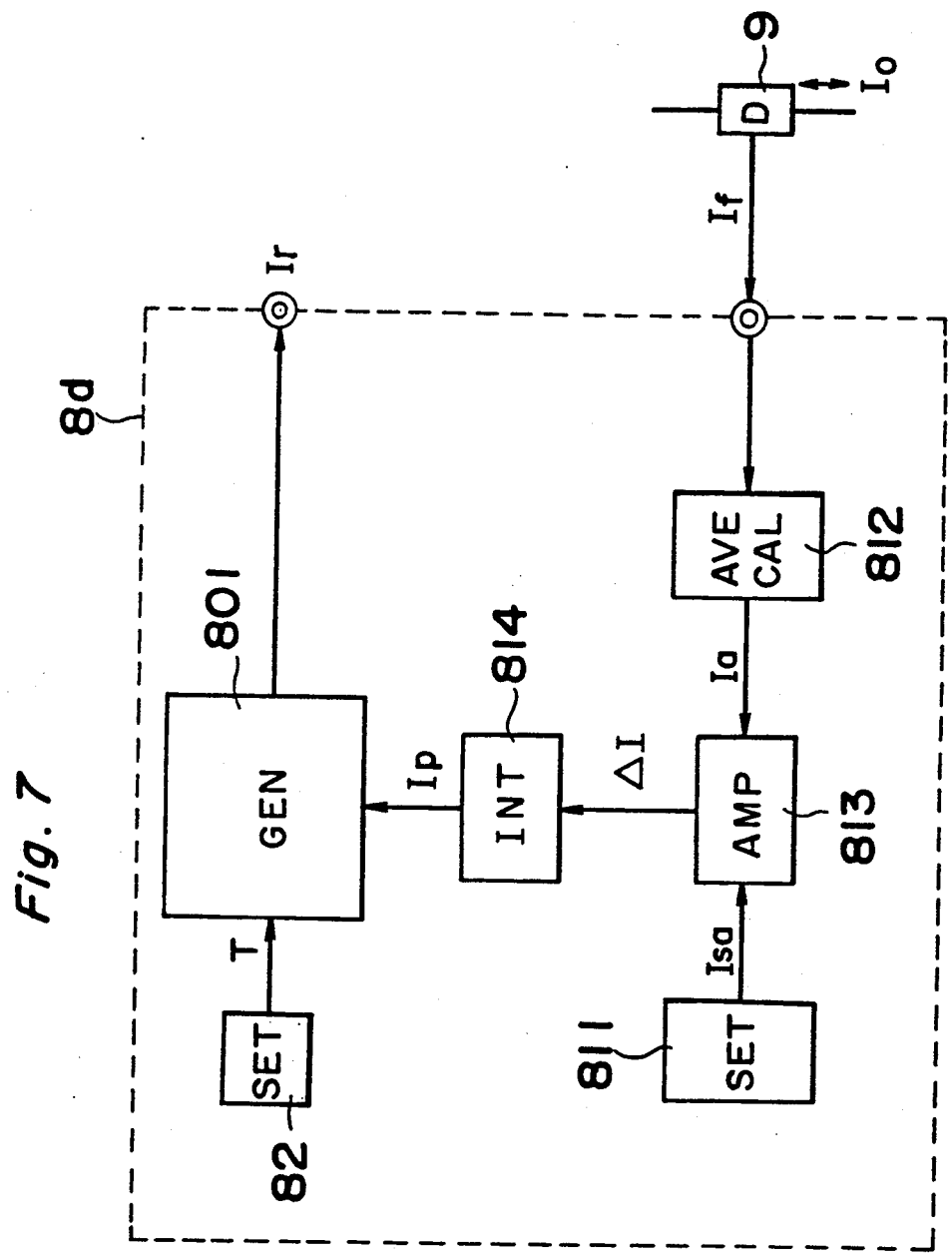
FIG. 7 is a schematic block diagram showing a reference signal generator 8d to be used for the power source of the preferred embodiments.

FIG. 7 is a schematic block diagram showing a reference signal generator 8d to be used for the power source of the preferred embodiments. The reference signal generator 8d is characterized in generating the reference signal Ir so that the average value of the welding current Io does not change depending on the waveform of the reference signal Ir.

Referring to FIG. 7, there is provided a welding current setting circuit 811 for setting an average value Isa of the welding current Io and outputting a signal corresponding to the set average value Isa thereof to an error amplifier 813, and an average value calculator 812 for calculating the average value of the welding current Io in response to the detection signal If outputted from the welding current detector 9 and outputting a signal corresponding to the calculated average value Ia to the error amplifier 813. The error amplifier 813 subtracts the signal outputted from the welding current setting circuit 811 from the signal outputted from the average value calculator 812, and then, outputs a difference signal $\Delta I = Isa - Ia$ to an integrator 814. The integrator 814 integrates the difference signal $\Delta I$ and outputs the integrated signal corresponding to a peak value of the welding current Io to be set, to the signal generator 801. The signal generator 801 generates a periodic signal, having a peak value set by the signal outputted from the integrator 814, and a time interval Tsp of the straight polarity and a time interval Trp of the reverse polarity which are set by the time interval setting circuit 82.

In the reference signal generator 8d shown in FIG. 7, since the information of the average value Ia of the welding current Io is fed back to the signal generator 801, the reference signal Ir is generated so that the average value of the welding current Io coincides with the average value Isa which is set by the welding current setting circuit 811. Therefore, even though the waveform of the reference signal Ir generated by the signal generator 801 is altered to any waveform, the average value of the welding current Io which changes periodically does not change.

In the above-mentioned reference signal generator 8d shown in FIG. 7, the average value calculator 812 calculates the average value Ia of the welding current Io in response to the detection signal If outputted from the welding current detector 9. However, the present invention is not limited to this, the average value calculator 812 may calculates the average value Ia thereof in response to the reference signal Ir outputted from the signal generator 801.

Further, in order not to change the effective value of the welding current Io depending on the waveform of the reference signal Ir, an effective value calculator for calculating the effective value of the welding current Io in response to the detection signal If may be used in stead of the average value calculator 812.

Furthermore, in the above-mentioned reference signal generators 8a to 8d, as the signal generator 801 thereof, there can be used a circuit for dividing an alternating-current voltage outputted from a commercial alternating-current power source and generating a sine wave signal, or an oscillator which are well known to those skilled in the art. However, the following circuit may be used. In this case, data of the instantaneous values of respective waveforms of the reference signal Ir are stored in a ROM as a group of digital data, and then, these data are read out from the ROM so as to obtain data of one period thereof. Then, the length of one period is determined by the speed at which a group of data are read out from the ROM.

Reference signal generator 8e

Figure 8:
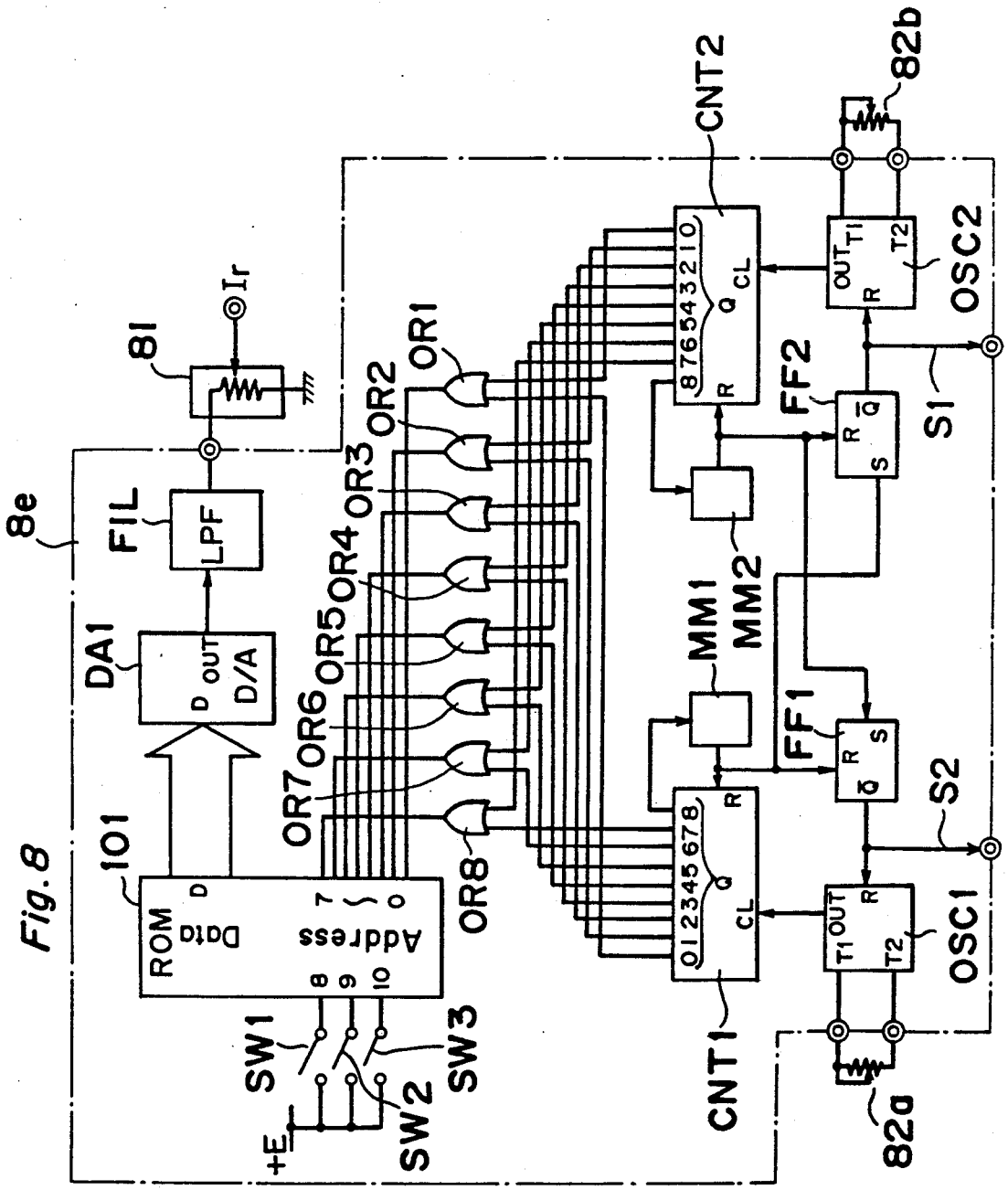
FIG. 8 is a schematic block diagram showing a reference signal generator 8e to be used for the power source of the preferred embodiments.

FIG. 8 is a schematic block diagram showing a reference signal generator 8e to be used for the power source of the preferred embodiments.

Referring to FIG. 8, a pulse oscillator OSC1 generates a pulse signal having a frequency set by a variable resistor 82a while a low level signal is inputted from an output terminal $\overline{Q}$ of an R-S type flip-flop FF1 to a control terminal R thereof, and outputs the generated pulse signal from an outputs terminal thereof to an input terminal CL of a counter CNT1. On the other hand, a pulse oscillator OSC2 generates a pulse signal having a frequency set by a variable resistor 82b while a low level signal is inputted from an output terminal $\overline{Q}$ of an R-S type flip-flop FF2 to a control terminal R thereof, and outputs the generated pulse signal from an outputs terminal thereof to an input terminal CL of a counter CNT2. When each of the flip-flops FF1 and FF2 is set at a leading edge of a signal inputted to a set terminal S thereof, the signal outputted from the output terminal $\overline{Q}$ thereof is inverted from the high level to the low level. Further, when each of the flip-flops FF1 and FF2 is reset at a leading edge of a signal inputted to a reset terminal R thereof, the signal outputted from the output terminal $\overline{Q}$ is inverted from the low level to the high level.

The counters CNT1 counts a pulse signal outputted from the output terminal OUT of the pulse oscillator OSC1, and then, outputs data of the count value from the output terminals Q0 to Q8 thereof to respective first input terminals of OR gates OR1 to OR8 and a monostable multivibrator MM1. The counters CNT2 counts a pulse signal outputted from the output terminal OUT of the pulse oscillator OSC2, and then, outputs data of the count value from the output terminals Q0 to Q8 thereof to respective second input terminals of the OR gates OR1 to OR8 and a monostable multivibrator MM1. The monostable multivibrator MM1 is triggered in response to a signal outputted from the output terminal Q8 of the counter CNT1, and a signal outputted from the output terminal of the monostable multivibrator MM1 is outputted to respective reset terminals R of the counter CNT1 and the flip-flop FF1 and the set terminal S of the flip-flop FF2. The monostable multivibrator MM2 is triggered in response to a signal outputted from the output terminal Q8 of the counter CNT2, and a signal outputted from the output terminal of the monostable multivibrator MM2 is outputted to respective reset terminals R of the counter CNT2 and the flip-flop FF2 and the set terminal S of the flip-flop FF1.

The output terminals of the OR gates OR1 to OR8 are respectively connected to address terminals 0 to 7 of a ROM 101 for storing plural groups of data of reference signals Ir which are predetermined as plural tables. The address terminals 8 to 10 of the ROM 101 are respectively connected to a voltage source +E through waveform selection switches SW1 to SW3 for selecting one of the above-mentioned plural tables, or one of three kinds of reference signals Ir. After one table or one group of the reference signals Ir is selected by the switches SW1 to SW3, data of the reference signal Ir are selected depending on the signals outputted from the OR gates OR1 to OR8, and then, the data thereof are read out from the ROM 101 and are outputted from data terminals D thereof to input terminals D of an digital to analogue converter (referred to as a D/A converter hereinafter) DA1.

The D/A converter DA1 converts data outputted from the ROM 101 into an analogue signal, and outputs the converted analogue signal to a variable resistor 81 through a low-pass filter FIL, wherein the low-pass filter FIL is provided for rejecting a high frequency component from the analogue signal outputted from the D/A converter DAI so as to convert it into an analogue signal which gradually changes. The variable resistor 81 is provided for adjusting the signal level of the reference signal Ir to be outputted.

In the reference signal generator 8e shown in FIG. 8, when the signal outputted from the output terminal $\overline{Q}$ of the flip-flop FF1 is inverted from the high level to the low level, the pulse oscillator OSC1 starts in generating a pulse signal having a frequency set by the variable resistor 82a. The pulse signal of the pulse oscillator OSC1 is supplied to the input terminal CL of the counter CNT1 and is counted by the counter CNT1, and then, data of the count value are outputted therefrom to the address terminals of the ROM 101 through the OR gates OR1 to OR8. At that time, the ROM 101 outputs data of the reference signal Ir which is specified by the data outputted from the counter CNT1 among one group of the data of the reference signals Ir which is selected by the waveform selection switches SW1 to SW3, and then, the data outputted from the ROM 101 are converted into an analogue signal by the D/A converter DA1.

Since data of the reference signal Ir changes depending the data outputted from the counter CNT1 which changes every time a pulse signal is supplied from the pulse oscillator OSC1 to the counter CNT1, the analogue signal outputted from the D/A converter DA1 changes in a form of steps every time a pulse signal is outputted from the pulse oscillator OSC1. The high frequency component of the analogue signal changing in a form of steps is rejected by the low-pass filter FIL so that the analogue signal thereof changes gradually, and the level of the filtered analogue signal is adjusted by the variable resistor 81. The level-adjusted analogue signal is outputted as the reference signal Ir for controlling the welding current Io. Thus, counting of the counter CNT1 is performed every time a pulse signal is outputted from the pulse oscillator OSC1, and then, the reference signal Ir changes.

Thereafter, when the signal outputted from the output terminal Q8 of the counter CNT1 becomes the high level, the monostable multivibrator MM1 is triggered, and then, the signal outputted from the monostable multivibrator MM1 becomes the high level for a predetermined time interval. The high level output signal of the monostable multivibrator MM1 is inputted to the reset terminal R of the counter CNT1, and then, the counter CNT1 is reset. Simultaneously, the high level output signal of the monostable multivibrator MM1 is inputted to the reset terminal R of the flip-flop FF1 and the set terminal S of the flip-flop FF2. As a result, the flip-flop FF1 is reset so that the signal outputted from the output terminal $\overline{Q}$ thereof is inverted from the low level to the high level, and then, the pulse oscillator OSC1 stops generating the pulse signal. On the other hand, in response to the high level signal of the monostable multivibrator MM1, the flip-flop FF2 is set so that the signal outputted from the output terminal $\overline{Q}$ thereof is inverted from the high level to the low level, and then, the pulse oscillator OSC2 starts in generating a pulse signal having a frequency set by the variable resistor 82b.

The pulse signal outputted from the pulse oscillator OSC2 is counted by the counter CNT2, and data of the count value of the counter CNT2 are outputted to the address terminals of the ROM 101 through the OR gates OR1 to OR8. At that time, the ROM 101 outputs data of the reference signal Ir which is specified by the data outputted from the counter CNT2 among one group of the data of the reference signals Ir which is selected by the waveform selection switches SW1 to SW3, and then, the data outputted from the ROM 101 are outputted through the D/A converter DA1 and the low-pass filter FIL as the reference signal Ir which changes gradually. Thus, counting of the counter CNT2 is performed every time a pulse signal is outputted from the pulse oscillator OSC2, and then, the reference signal Ir changes.

Thereafter, when the signal outputted from the output terminal Q8 of the counter CNT2 becomes the high level, the monostable multivibrator MM2 is triggered, and then, the signal outputted from the monostable multivibrator MM2 becomes the high level for a predetermined time interval. Then, the counter CNT2 and the flip-flop FF2 are reset, and also the flip-flop FF1 is set again, resulting in the start state of this process of the reference signal generator 8e.

In the present preferred embodiment, a time interval from a timing when the output signal $\overline{Q}$ of the flip-flop FF1 is inverted from the high level to the low level to a timing when it returned to the high level again, or a time interval while the pulse oscillator OSC1 generates the pulse signal corresponds to the time interval of the straight polarity. On the other hand, a time interval from a timing when the output signal $\overline{Q}$ of the flip-flop FF2 is inverted from the high level to the low level to a timing when it is returned to the high level again corresponds to the time interval of the reverse polarity. Therefore, the output signal $\overline{Q}$ of the flip-flop FF1 can be used as the polarity switching control signal S2 for representing the time interval of the reverse polarity shown in FIGS. 1 and 3. On the other hand, the output signal $\overline{Q}$ of the flip-flop FF2 can be used as the polarity switching control signal S1 for representing the time interval of the straight polarity shown in FIGS. 1 and 3.

Further, an output signal Q of the flip-flop FF1 may be used as the control signal S1, and an output signal Q of the flip-flop FF2 may be used as the control signal S2. Furthermore, after inverting the output signal $\overline{Q}$ of the flip-flop FF1, the inverted signal may be used as the control signal S1. After inverting the output signal $\overline{Q}$ of the flip-flop FF2, the inverted signal may be used as the control signal S2.

In the reference signal generator 8e shown in FIG. 8, the variable resistor 82a is provided for setting a frequency of the pulse signal generated by the pulse oscillator OSC1, and the output signal Q8 of the counter CNT1 becomes the high level when the counter CNT1 has counted a predetermined number of pulse signals. Therefore, as the frequency of the pulse signal is set at a higher value, the time interval until the output signal Q8 thereof becomes the high level becomes shorter. On the other hand, as the frequency of the pulse signal is set at a lower value, the time interval thereof becomes longer. Accordingly, the variable resistor 82a is used as an adjusting device for setting the length of the time interval of the straight polarity of the welding current Io. On the other hand, the variable resistor 82b is used as an adjusting device for setting the length of the time interval of the reverse polarity of the welding current Io.

One of the variable resistors 82a and 82b may be set to a fixed resistor. Further, both the variable resistors 82a and 82b may be interlocked so that the resistance of the variable resistor 82a changes in a changing direction opposite to that of the resistance of the variable resistor 82b.

Furthermore, the variable resistor 81 corresponds to the welding current setting circuit 81 shown in the preferred embodiment of FIG. 1.

In the reference signal generator 8e of the preferred embodiment shown in FIG. 8, the control signal generator 12 and the switching controller 7 can be omitted since the control signals S1 and S2 are outputted from the flip-flops FF2 and FF1, respectively.

In the reference signal generator 8e shown in FIG. 8, the counters CNT1 and CNT2 each having the output terminals Q0 to Q8 of nine bits are used. However, as the bit number of the output terminals of each of the counters CNT1 and CNT2 becomes smaller, the height of each changing step of the digital data of the reference signal Ir becomes larger, resulting in deterioration in the waveform of the reference signal Ir. On the other hand, as the bit number of the output terminals of each of the counters CNT1 and CNT2 becomes larger, the height of each changing step of the digital data of the reference signal Ir becomes smaller, resulting in the reference signal Ir which changes more gradually. In this case, there is such an disadvantage that the necessary memory capacity of the ROM 101 becomes larger.

Further, if data of the reference signals Ir having various kinds of waveforms such as a sine waveform, a half-circular waveform, a trapezoid-shaped waveform are stored in the ROM 101, there can be obtained various kinds of reference signals Ir. In this case, as described above, in order to obtain a reference signal Ir having different peak values for respective time intervals of the straight polarity and the reverse polarity, or in order to obtain a reference signal Ir having different waveforms therefor, the waveform selection switches SW1 to SW3 are switched every half-wave of the reference signal Ir or the welding current Io.

In the reference signal generator 8e shown in FIG. 8, the high level output signal of the monostable multivibrator MM2 is applied to the set terminal S of the flip-flop FF1 so as to set flip-flop FF1, and the high level output signal of the monostable multivibrator MM1 is applied to the set terminal S of the flip-flop FF2 so as to set the flip-flop FF2. However, the present invention is limited to this. In stead of the output signals of the monostable multivibrators MM1 and MM2, the output signal $\overline{Q}$ of the flip-flop FF1 may be applied to the set terminal S of the flip-flop FF2, and the output signal $\overline{Q}$ of the flip-flop FF2 may be applied to the set terminal S of the flip-flop FF1.

Reference signal generator 8f

Figure 9:
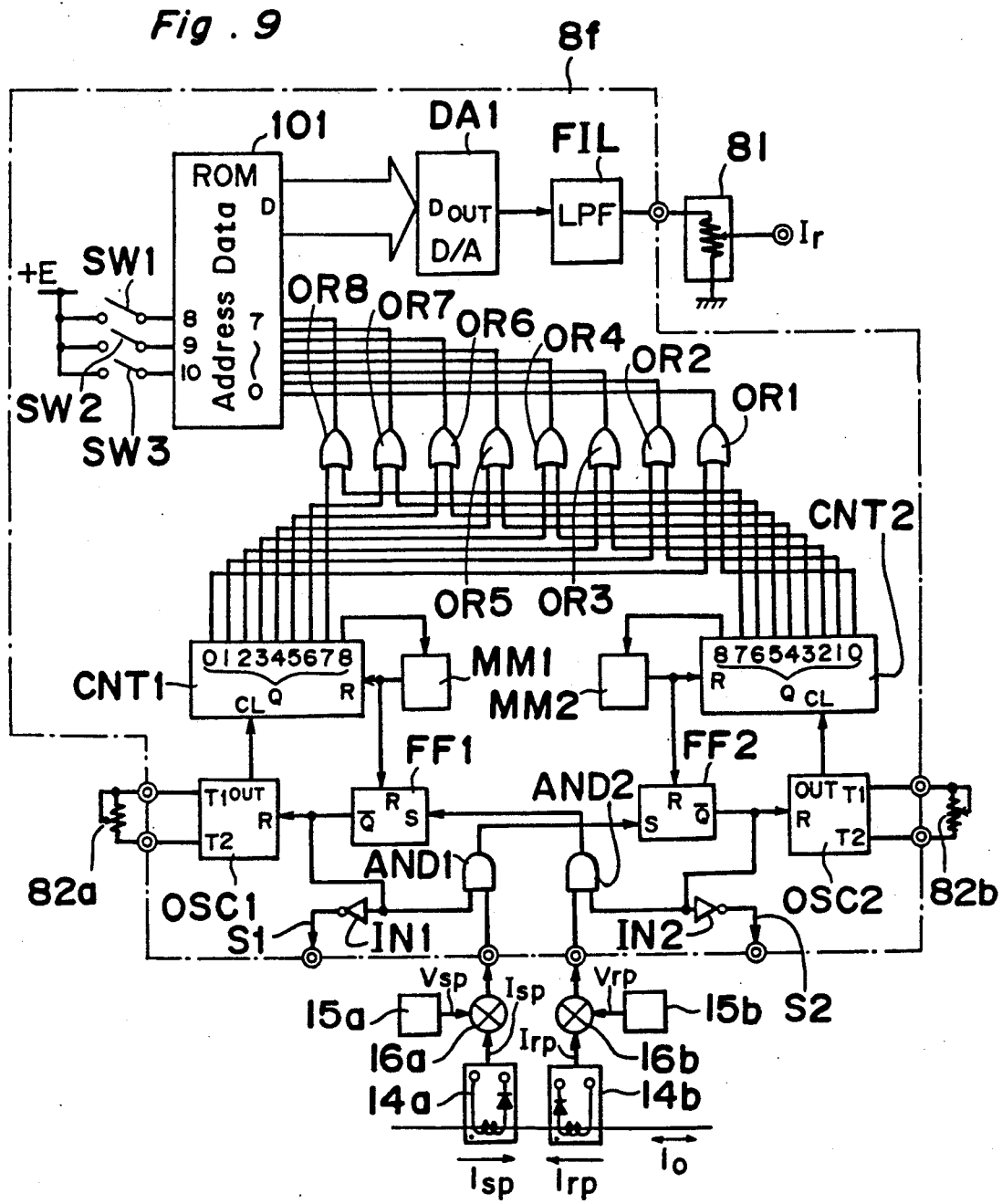
FIG. 9 is a schematic block diagram showing a reference signal generator 8f to be used for the power source of the preferred embodiments.

FIG. 9 is a schematic block diagram showing a reference signal generator 8f of another type to be used for the power source of the preferred embodiments. In FIG. 9, the same components as those shown in FIG. 8 are denoted by the same numerals as those shown in FIG. 8.

As compared with the reference signal generator 8e shown in FIG. 8, the reference signal generator 8f is characterized in that there is provided two AND gates AND1 and AND2 and two invertors IN1 and IN2, and further, there is provided two current sensors 14a and 14b, two current setting circuits 15a and 15b, and two comparators 16a and 16b. The different points between the reference signal generators 8e and 8f will be described below.

Each of the current sensors 14a and 14b is preferably composed of a current transformer and a half-wave rectifier of a diode. The current sensor 14a detects the welding current Isp having a straight polarity supplied to the welding electrode 5 and the work 6, and outputs a signal corresponding to the above welding current Isp. On the other hand, the current sensor 14b detects the welding current Irp having a reverse polarity supplied thereto, and outputs a signal corresponding to the above welding current Irp.

The current setting circuit 15a is provided for setting a welding current value of the straight polarity, and outputs a reference signal Vsp corresponding to the set welding current value of the straight polarity to the comparator 16a. On the other hand, the current setting circuit 15b is provided for setting a welding current value of the reverse polarity, and outputs a refernece signal Vrp corresponding to the set welding current value of the reverse polarity to the comparator 16b.

The comparator 16a compares the signal outputted form the current sensor 14a with the reference signal Vsp outputted from the current setting circuit 15a. Then, if Isp<Vsp, the comparator 16a outputs a high level signal to the first input terminal of the AND gate AND1. On the other hand, if Isp≧Vsp, the comparator 16a outputs a low level signal thereto. Further, the comparator 16b compares the signal outputted from the current sensor 14b with the reference signal Vrp outputted from the current setting circuit 15b. Then, if Irp<Vrp, the comparator 16b outputs a high level signal to the first input terminal of the AND gate AND2. On the other hand, if Irp≧Vrp, the comparator 16b outputs a low level signal thereto.

Furthermore, the output signal $\overline{Q}$ of the flip-flop FF1 is inputted to the second input terminal of the AND gate AND1, and also is outputted through an invertor IN1 as the control signal S1. On the other hand, the output signal $\overline{Q}$ of the flip-flop FF2 is inputted to the second input terminal of the AND gate AND2, and also is outputted through an invertor IN2 as the control signal S2. Further, when both signals inputted to the input terminals of the AND gate AND1 become the high level, the AND gate AND1 outputs a high level signal to the set terminal S of the flip-flop FF2. Otherwise, the AND gate AND1 outputs a low level signal thereto. On the other hand, when both signals inputted to the input terminals of the AND gate AND2 become the high level, the AND gate AND2 outputs a high level signal to the set terminal S of the flip-flop FF1. Otherwise, the AND gate AND2 outputs a low level signal thereto.

In the reference signal generator 8f shown in FIG. 9, when the output signal Q8 of the counter CNT1 becomes the high level after counting of the counter CNT1 is completed, the monostable multivibrator MM1 is triggered, and then, the flip-flop FF1 is reset so that the output signal $\overline{Q}$ thereof is inverted from the low level to the high level, resulting in stop of the oscillation of the pulse oscillator OSC1. At that time, the control signal S1 for representing the time interval of the straight polarity which is obtained after inverting the output signal $\overline{Q}$ of the flip-flop FF1 is inverted from the high level to the low level, however, the welding current Isp of the straight polarity can not be zero soon since there is an inductance in a welding load circuit including the welding electrode 5 and the work 6. At that time, the welding current Isp decreases according to the time constant of the welding load circuit thereof.

The welding current Isp is detected as described above, and thereafter, when Isp<Vsp, the AND gate AND1 is opened so that the high level signal is applied to the set terminal S of the flip-flop FF2. Then, the flip-flop FF2 is set so that the output signal $\overline{Q}$ thereof is inverted from the high level to the low level, and then, the pulse oscillator OSC2 starts in generating the pulse signal so that the control signal S2 for representing the time interval of the reverse polarity and the reference signal Ir are outputted. At the end of the time interval of the reverse polarity, the time interval of the straight polarity is not started until Irp<Vrp.

In the reference signal generator 8f shown in FIG. 9, in the case that the inductance of the welding load circuit is relatively large, even though the welding current Io decreases toward zero gradually, when the welding current Io certainly becomes smaller than the above-mentioned threshold current, the above-mentioned switching circuit operates so that a welding current Io having an opposite polarity flows.

In the reference signal generator 8f shown in FIG. 9, at a timing when the pulse oscillator OSC1 or OSC2 stops generating the pulse signal, a pair of transistors 3a and 3b or a pair of transistor 3c and 3d is turned off. Therefore, in the case that the inductance of the welding load circuit is relatively large, there is a possibility of applying a high surge voltage to the transistors to be turned off. In order to prevent application of a high surge voltage thereto, the output signal Q of the flip-flop FF1 or the output signal $\overline{Q}$ of the flip-flop FF2 is preferably used as the control signal S1, and also the output signal Q of the flip-flop FF2 or the output signal $\overline{Q}$ of the flip-flop FF1 is preferably used as the control signal S2. In this case, after the pulse oscillator OSC1 or OSC2 stops in generating the pulse signal, the welding current Io decreases and becomes the above-mentioned threshold current value, the polarity switching transistors are turned off in synchronization to switching the polarity. Therefore, occurrence of a high surge voltage can be certainly prevented.

In the reference signal generators 8e and 8f shown in FIGS. 8 and 9, for respective time intervals of the straight polarity and the reverse polarity, there is provided the pulse oscillators OSC1 and OSC2, the flip-flops FF1 and FF2, the counters CNT1 and CNT2, and the monostable multivibrators MM1 and MM2, and then, the control signals S1 and S2 are obtained from two systems corresponding to respective time intervals. However, the present invention is not limited to this, the following reference signal generators 8g and 8h shown in FIGS. 10 and 11 may be used.

Reference signal generator 8g

Figure 10:
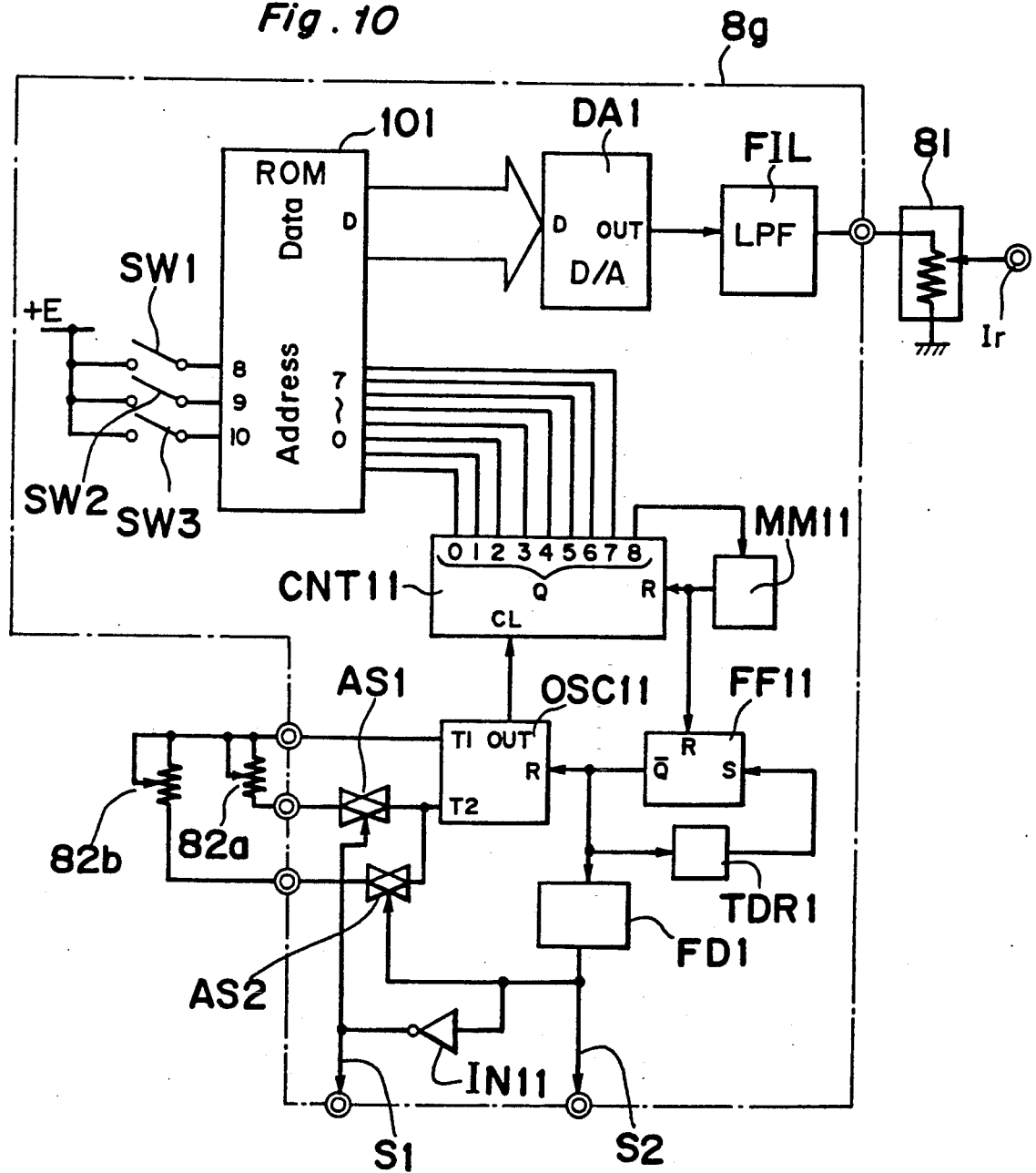
FIG. 10 is a schematic block diagram showing a reference signal generator 8g to be used for the power source of the preferred embodiments.

FIG. 10 is a schematic block diagram showing the reference signal generator 8g of this type to be used for the power source of the preferred embodiments. In FIG. 10, the same components as those shown in FIGS. 8 and 9 are denoted by the same numerals as those shown in FIGS. 8 and 9.

Referring to FIG. 10, there is provided a pulse oscillator OSC11 which acts in a manner similar to that of each of the pulse oscillators OSC1 and OSC2, a flip-flop FF11 which acts in a manner similar to that of each of the flip-flops FF1 and FF2, a counter CNT11 which acts in a manner similar to that of each of the counters CNT1 and CNT2, and a monostable multivibrator MM11 which acts in a manner similar to that of each of the monostable multivibrators MM1 and MM2. It is to be noted that the ROM 101, the waveform selection switches SW1 to SW3, the D/A converter DA1 and the low-pass filter FIL are electrically connected in a manner similar to that of those shown in FIGS. 8 and 9.

Respective one ends of the variable resistors 82a and 82b are connected to the frequency control terminal T1 of the pulse oscillator OSC11. Another end of the variable resistor 82a is connected through an analogue switch AS1 to the frequency control terminal T2 of the pulse oscillator OSC11, and another end of the variable resistor 82b is connected through an analogue switch AS2 to the frequency control terminal T2 of the pulse oscillator OSC11. There is provided a timer TDR1 for counting a predetermined reset time of the counter CNT11, which is preferably preset at about several microseconds. In response to the output signal $\overline{Q}$ of the flip-flop FF11, the timer TDR1 starts in counting the predetermined reset time at a leading edge of the output signal $\overline{Q}$ thereof, and thereafter, when counting thereof is completed, the timer TDR1 outputs the high level signal to the set terminal S of the flip-flop FF11.

Further, the flip-flop FF11 outputs the output signal $\overline{Q}$ to the reset terminal R of the pulse oscillator OSC11, the timer TDR1 and a ½ frequency divider FD1. The frequency divider FD1 divides the frequency of the output signal $\overline{Q}$ of the flip-flop FF11 by two, namely, converts the output signal $\overline{Q}$ of the flip-flop FF11 into a pulse signal so that the frequency of the converted pulse signal becomes half the frequency of the output signal $\overline{Q}$ thereof, and outputs the converted signal to the above-mentioned switching circuit as the control signal S2, to the control terminal of the analogue switch AS2. Also, the frequency divider FD1 outputs the converted signal through the control terminal of the analogue switch AS1, and to the above-mentioned switching circuit as the control signal S1.

The pulse oscillator OSC11 generates a pulse signal having a frequency set by a variable resistor 82a or 82b. Namely, when the analogue switch AS1 is closed while the control signal S1 becomes the high level, the frequency of the pulse oscillator OSC11 is set by the variable resistor 82a. On the other hand, when the analogue switch AS2 is closed while the control signal S2 becomes the high level, the frequency of the pulse oscillator OSC11 is set by the variable resistor 82b.

In the reference signal generator 8g shown in FIG. 10, when the output signal $\overline{Q}$ of the flip-flop FF11 is inverted from the high level to the low level, the pulse oscillator OSC11 starts in generating a pulse signal, and outputs it to the input terminal CL of the counter CNT11. Then, the pulse signal is counted by the counter CNT11, and then, data of the count value thereof which change every time a pulse signal is outputted are outputted from the output terminals Q0 to Q8 thereof to the address terminals 0 to 7 of the ROM 101.

In response to the data of the count value, the ROM 101 outputs data of the reference signal Ir which is specified by the data of the count value among one group of the data of the reference signals Ir which is selected by the waveform selection switches SW1 to SW3. The data of the reference signal Ir read out from the ROM 101 are converted into an analogue signal by the D/A converter DA1, and then, the high frequency component of the converted analogue signal is rejected by the low-pass filter FIL so as to output an analogue signal which changes gradually. The level of the filtered analogue signal is adjusted by the variable resistor 81, and then, the level-adjusted analogue signal is outputted as the reference signal Ir.

Thereafter, counting of the counter CNT11 is performed every time a pulse signal is outputted from the pulse oscillator OSC11, and the reference signal Ir changes accompanying with this. Thereafter, when the output signal Q8 of the counter CNT11 becomes the high level, the monostable multivibrator MM11 is triggered so that the output signal thereof becomes the high level. The high level output signal of the monostable multivibrator MM11 is inputted to the reset terminal R of the counter CNT11 so as to reset the counter CNT11, and simultaneously, the high level output signal of the monostable multivibrator MM11 is applied to the reset terminal R of the flip-flop FF11. As a result, the flip-flop FF11 is reset so that the output signal $\overline{Q}$ thereof is inverted from the low level to the high level, resulting in stop of oscillation of the pulse generator OSC11.

At a timing delayed by the timer TDR1 from the leading edge of the output signal $\overline{Q}$ by the predetermined reset time, the high level output signal $\overline{Q}$ is applied to the set terminal S of the flip-flop FF11 so as to set the flip-flop FF11 again. Then, the output signal $\overline{Q}$ of the flip-flop FF11 is inverted from the high level to the low level. Since it is necessary to complete the reset of the counter CNT11 until the output signal $\overline{Q}$ is inverted from the high level to the low level, the timer TDR1 is set at the predetermined reset time which is slightly longer than a time required for resetting the counter CNT11. Normally, the above predetermined reset time is smaller than about several microseconds.

Thereafter, when the flip-flop FF11 is set by the timer TDR1 so that the output signal $\overline{Q}$ thereof becomes the low level, the pulse oscillator OSC11 starts in generating a pulse signal again, and then, the pulse signal is counted by the counter CNT11. The data of the count value of the counter CNT11 are outputted to the address terminals of the ROM 101. In a manner similar to that described above, the data of the reference signal Ir are read out from the ROM 101, and then, the reference signal Ir is outputted.

In the reference signal generator 8g shown in FIG. 10, a time interval from a timing when the output signal $\overline{Q}$ of the flip-flop FF11 is inverted from the high level to the low level to a timing when it is returned to the high level again, or a time interval while the pulse oscillator OSC11 generates the pulse signal is determined by the variable resistor 82a or 82b which is connected to the frequency control terminals T1 and T2 of the pulse oscillator OSC11.

The frequency of the output signal $\overline{Q}$ of the flip-flop FF11 is divided by the frequency divider FD1 so as to output a pulse signal having half the frequency of the output signal $\overline{Q}$ thereof, as the control signal S2 for representing the time interval of the reverse polarity. Further, the control signal S2 is inverted by the invertor IN11, and then, the inverted signal is outputted as the control signal S1 for representing the time interval of the straight polarity. On the other hand, the analogue switches AS1 and AS2 are alternately closed in response to the control signals S1 and S2, thereby selecting one of the variable resistors 82a and 82b for setting the time intervals of the straight polarity and the reverse polarity, respectively.

Reference signal generator 8h

Figure 11:
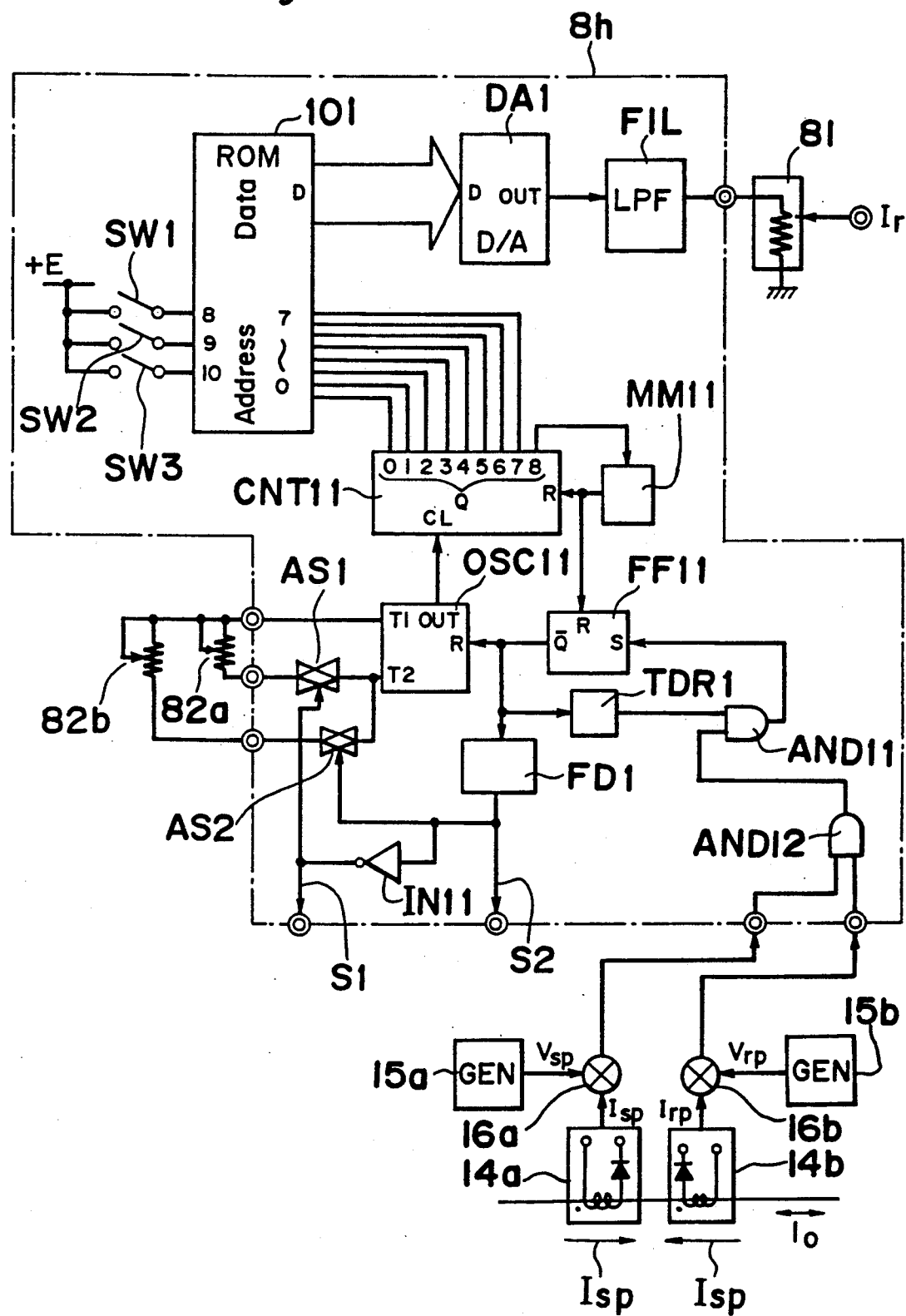
FIG. 11 is a schematic block diagram showing a reference signal generator 8h to be used for the power source of the preferred embodiments.

FIG. 11 is a schematic block diagram showing the reference signal generator 8h of another type to be used for the power source of the preferred embodiments. In FIG. 11, the same components as those shown in FIGS. 8 to 10 are denoted by the same numerals as those shown in FIGS. 8 to 10.

The reference signal generator 8h is a combination of the reference signal generators 8f and 8g shown in FIGS. 9 and 10. Namely, there is further provided two AND gates AND11 and AND12 in the reference signal generator 8h in addition to the composition of the reference signal generator 8g, and also there is provided the current sensors 14a and 14b, the current setting circuits 15a and 15b, and the comparators 16a and 16b, which are shown in FIG. 9.

Referring to FIG. 11, the signal outputted from the comparator 16a is inputted to the first input terminal of the AND gate AND12, and the signal outputted from the comparator 16b is inputted to the second input terminal of the AND gate AND12. The signal outputted from the AND gate AND12 is inputted to the first input terminal of the AND gate AND11. Further, the signal outputted from the timer TDR1 is inputted to the second input terminal of the AND gate AND11, and the signal outputted from the AND gate AND11 is inputted to the set terminal S of the flip-flop FF11.

In the reference signal generator 8h shown in FIG. 11, when counting of the counter CNT11 is completed and the output signal Q8 thereof becomes the high level, the monostable multivibrator MM11 is triggered so as to reset the flip-flop FF11. Then, the output signal $\overline{Q}$ of the flip-flop FF11 is inverted from the low level to the high level, resulting in stop of oscillation of the pulse generator OSC11. At that time, the control signal S1 for representing the time interval of the straight polarity is inverted from the high level to the low level. In this case, the welding current Isp of the straight polarity can not be zero soon since there is an inductance of the welding load circuit including the welding electrode 5 and the work 6, and then, the welding current Isp thereof deceases according to the time constant of the welding load circuit The welding current Isp thereof is detected by the current sensor 14a, and thereafter, when Isp<Vsp, the output signal of the comparator 16a becomes the high level. Then, since Irp=zero, Irp<Vrp, and the output signal of the comparator 16b is the high level. Therefore, the AND gate AND12 is opened, and then, the AND gate AND11 is also opened. At that time, the high level signal is applied to the set terminal S of the flip-flop FF11, and then, the flip-flop FF11 is set so that the output signal $\overline{Q}$ thereof is inverted from the high level to the low level. Then, the pulse oscillator OSC11 starts in generating a pulse signal again, and the control signal S2 having the high level for representing the time interval of the reverse polarity is outputted, and the reference signal Ir is outputted from the reference signal generator 8h. At the end of the time interval of the reverse polarity, similarly, the time interval of the straight polarity is not started until Irp<Vrp.

In a manner similar to that described above, the control signals S1 and S2 which have levels opposite to each other may be generated from the output signal Q of the flip-flop FF11.

In the reference signal generator 8h shown in FIG. 11, as well as the reference signal generator 8f shown in FIG. 9, the above-mentioned switching circuit can be operated so that a welding current Io of an opposite polarity flows after the welding current Io certainly becomes the predetermined threshold current.

It is to be noted that the reference signal generators 8e to 8h shown in FIGS. 8 to 11 can be used as the signal generator 801 shown in FIGS. 4a, 5a, 6 and 7.

Reference signal generator 8i

Figure 12A:
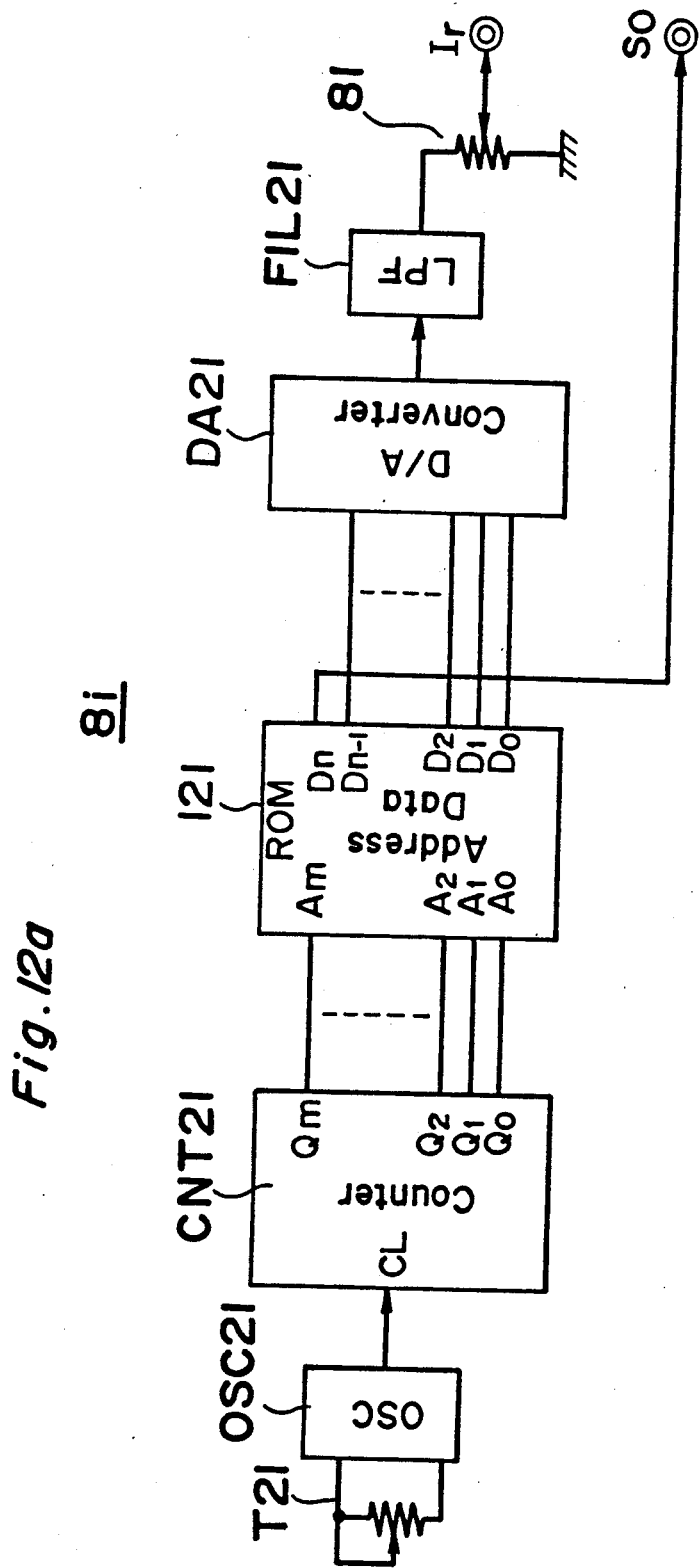
FIG. 12a is a schematic block diagram showing a reference signal generator 8i to be used for the power source of the preferred embodiments.

FIG. 12a is a schematic block diagram showing a reference signal generator 8i of a further type to be used for the power source of the preferred embodiments.

The reference signal generator 8i comprises a ROM 121 for storing data of digital signals composed of a reference signal Ir and a polarity switching signal S0. Namely, a predetermined bit of the digital signal is outputted as a polarity switching control signal S0, and the polarity of the output voltage to be outputted from the power source for the alternating-current arc welding is switched depending on the polarity switching control signal S0.

Referring to FIG. 12a, there is provided a pulse oscillator OSC21 for generating a pulse signal having a frequency set by a frequency setting circuit T21 of a variable resistor, and outputs the generated pulse signal to an input terminal CL of a counter CNT21 The counter CNT21 counts the number of the pulse signals outputted from the pulse oscillator OSC21, and outputs data of the count value from output terminals Q0 to Qm to address terminals A0 to Am of the ROM 121.

The ROM 121 stores data D0 to Dn−1 of the reference signal Ir and data Dn of the polarity switching control signal S0 at respective addresses A0 to Am. In response to the data of the count value outputted from the counter CNT21, the ROM 121 outputs data D0 to Dn−1 of the above-mentioned digital signal which are stored at the address specified by the data of the count value thereof to an D/A converter DA21, and also outputs data Dn as the polarity switching control signal S0. The D/A converter DA21 converts the data D0 to Dn−1 into an analogue signal, and outputs it to a low-pass filter FIL21. The low-pass filter FIL21 converts the converted analogue signal outputted from the D/A converter DA21 into an analogue signal which changes gradually, and outputs it to both ends of the variable resistor 81 for adjusting the output level of the reference signal Ir, wherein the variable resistor 81 corresponds to a welding current setting circuit for setting the level of the welding current Io.

In a preferred embodiment of the reference signal generator 8i shown in FIG. 12a, the counter CNT21 has the output terminals Q0 to Q5 of six bits, and the ROM 121 has the data terminals D0 to D7 of eight bits. In the ROM 121, data D8 of "0" is stored at each of binary addresses of "000000" to "001111", and data D8 of "1" is stored at each of the other binary addresses of "010000" to "111111". The data stored at the address of "000000" to "111111" are read out from the ROM 121, sequentially, by one address. The counter CNT21 counts the pulse signal outputted from the pulse oscillator OSC21, repeatedly, with a period which is a time interval while the data stored at the address of "000000" to "111111" are sequentially read out from the ROM 121. In this case, the polarity switching control signal S0 becomes the low level for a time interval from the beginning of one period to a first quarter of one period, and it becomes the high level for another time interval after the first quarter of one period to the end thereof. The ratio of the time interval of the reverse polarity of the welding current Io to the time interval of the straight polarity thereof becomes 1:3.

Figure 12B:
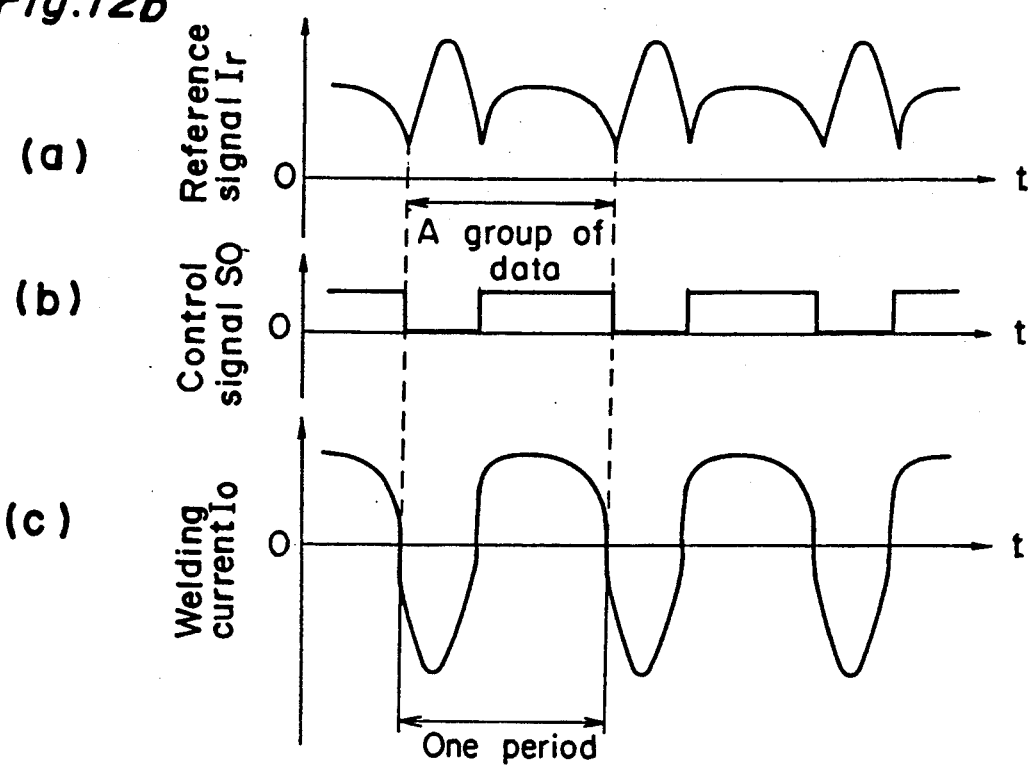

FIG. 12b is a timing chart of the reference signal Ir, the polarity switching control signal S0 and the welding current Io in this case.

As is apparent from FIG. 12b, any instantaneous value of the welding current Io can be obtained by storing data corresponding thereto in the ROM 121, and the lengths of the time intervals of the straight polarity and the reverse polarity can be determined by the most significant bit D8 of the data to be stored in the ROM 121.

Figure 12C:
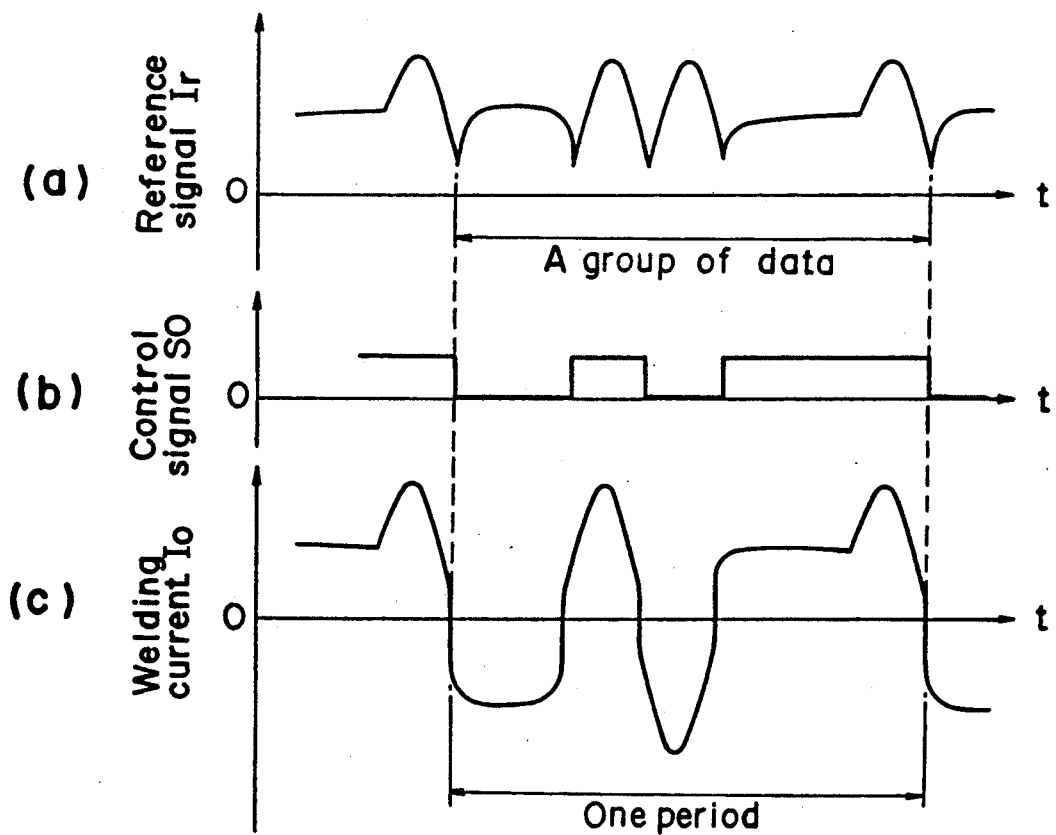

In the above-mentioned preferred embodiment, the polarity of the welding current Io is switched once within one period thereof. However, the polarity of the welding current Io can be switched plural times within one period thereof, as shown in FIG. 12c.

Reference signal generator 8j

Figure 13A:
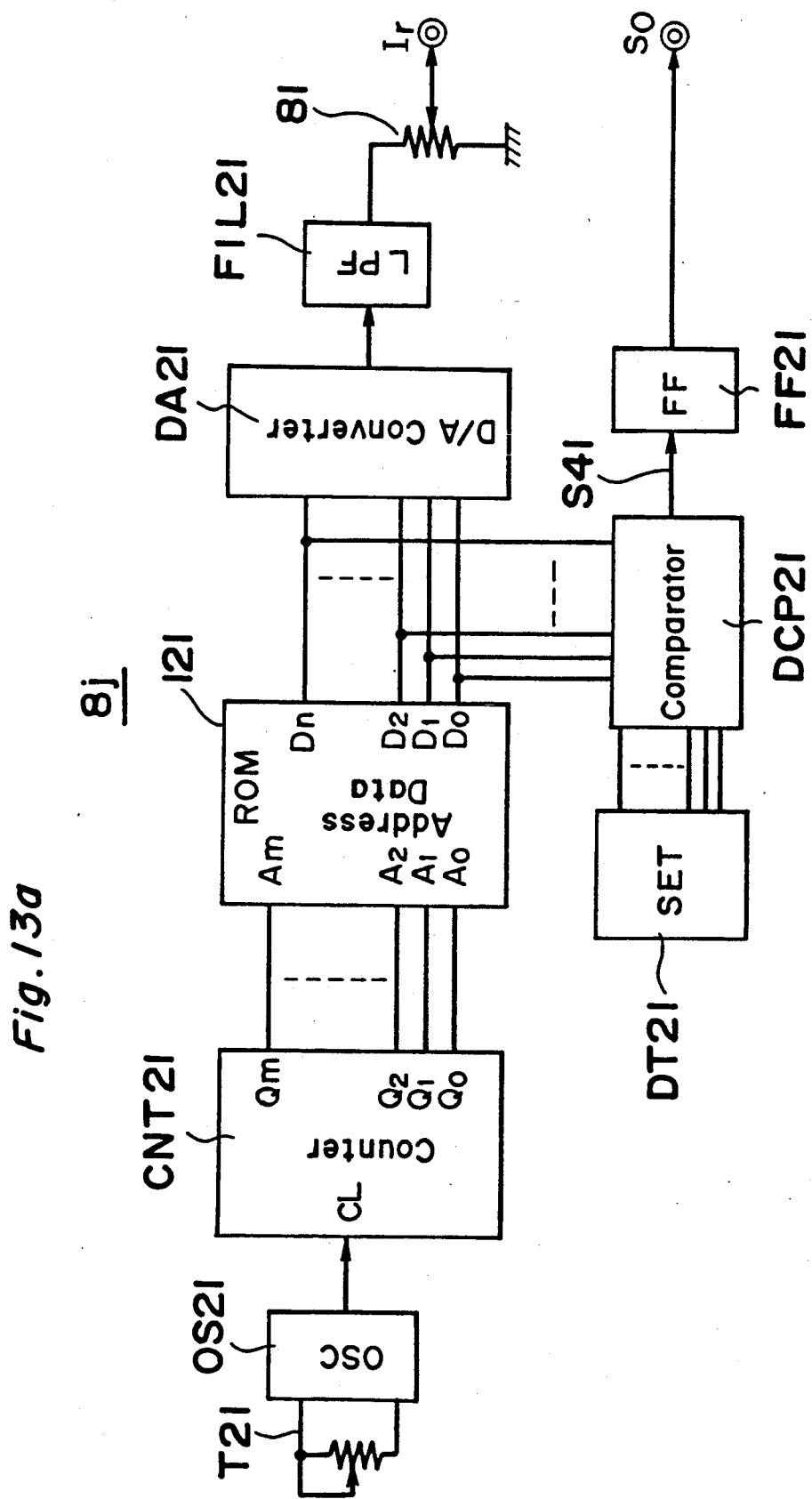
FIG. 13a is a schematic block diagram showing a reference signal generator 8j to be used for the power source of the preferred embodiments.

FIG. 13a is a schematic block diagram showing a reference signal generator 8j to be used for the power source of the preferred embodiments. In FIG. 13a, the same components as those shown in FIG. 12a are denoted by the same numerals as those shown in FIG. 12a.

The reference signal generator 8j shown in FIG. 13a is characterized in that there is provided a polarity control data setting circuit DT21, a digital comparator DCP21, and a T type flip-flop FF21 in addition to the composition of the reference signal generator 8i shown in FIG. 12a.

In the polarity control data setting circuit DT21, the same polarity control data for representing switching of the polarity of the welding current Io as those stored in the ROM 121 are set, and the polarity control data are outputted to the digital comparator DCP21.

For example, in a preferred embodiment, data of "00000000" are stored as the polarity control data in the ROM 121 while the polarity control data of "00000000" are set in the polarity control data setting circuit DT21. The digital comparator DCP21 compares the data outputted from the ROM 121 with the polarity control data outputted from the polarity control data setting circuit DT21. If these data coincide with each other, the digital comparator DCP21 outputs the high level signal S41 to the flip-flop FF21. Otherwise, the digital comparator DCP21 outputs the low level signal S41 thereto. The flip-flop FF21 outputs the high level signal or the low level signal as the polarity switching control signal S0, alternately, every time the signal outputted from the digital comparator DCP21 becomes the high level.

In the reference signal generator 8j shown in FIG. 13a, as polarity switching control data corresponding to timings when the polarity of the welding current Io is to be switched, there is used data other than data of the reference signal Ir. For example, when data of the reference signal Ir range from "00000000" to "10000000", data of "00000000" or "11111111" are stored in the ROM 121 in order to represent the switching of the polarity of the welding current Io, while the same data as these data are set in the polarity switching control data setting circuit DT21.

In the reference signal generator 8j shown in FIG. 13a, the pulse signal outputted from the pulse oscillator OSC21 is counted by the counter CNT21, and data of the count value of the counter CNT21 are outputted to the address terminals of the ROM 121. Thereafter, data stored at an address specified by the count value thereof are read out from the ROM 121, and then, the read data are converted into an analogue signal by the D/A converter DA21. The converted analogue signal is converted into an analogue signal which changes gradually by the low-pass filter FIL21, and the level of the analogue signal is adjusted by the level setting circuit 81 of the variable resistor. Thereafter, the level-adjusted analogue signal is outputted as the reference signal Ir.

At that time, the data outputted from the ROM 121 are also inputted to the digital comparator DCP21, and then, they are compared with the polarity control data outputted from the polarity control data setting circuit DT21 by the digital comparator DCP21. When both the data inputted to the digital comparator DCP21 coincide with each other, the output signal of the flip-flop FF21 is inverted, namely, the polarity switching control signal S0 is inverted.

FIG. 13b is a timing chart of the reference signal Ir, the signal S41, the polarity switching control signal S0 and the welding current Io in the reference signal generator 8j in the case of the polarity control data of "00000000".

As is apparent from FIG. 13b, every time the data of "00000000" are read out from the ROM 121, the polarity switching control signal S0 is inverted, and then, the polarity of the output voltage to be supplied to the welding electrode 5 and the work 6 is inverted. Then, the polarity of the welding current Io is inverted.

It is to be noted that, when counter CNT21 has counted the pulse signals of one period, the counter CNT21 is reset, and then, the count value data are cleared so that zero value is set at the counter CNT21.

In the reference signal generator 8j shown in FIG. 13a, any instantaneous value of the welding current Io can be obtained by storing data corresponding thereto in the ROM 121, and the lengths of the time intervals of the straight polarity and the reverse polarity can be determined by the polarity control data stored in the ROM 121 and set in the polarity control data setting circuit DT21.

In the above-mentioned preferred embodiment, the polarity of the welding current Io is switched once within one period thereof. However, the polarity of the welding current Io can be switched plural times within one period thereof, by storing the polarity control data at plural addresses of the ROM 121.

Reference signal generator 8k

Figure 14A:
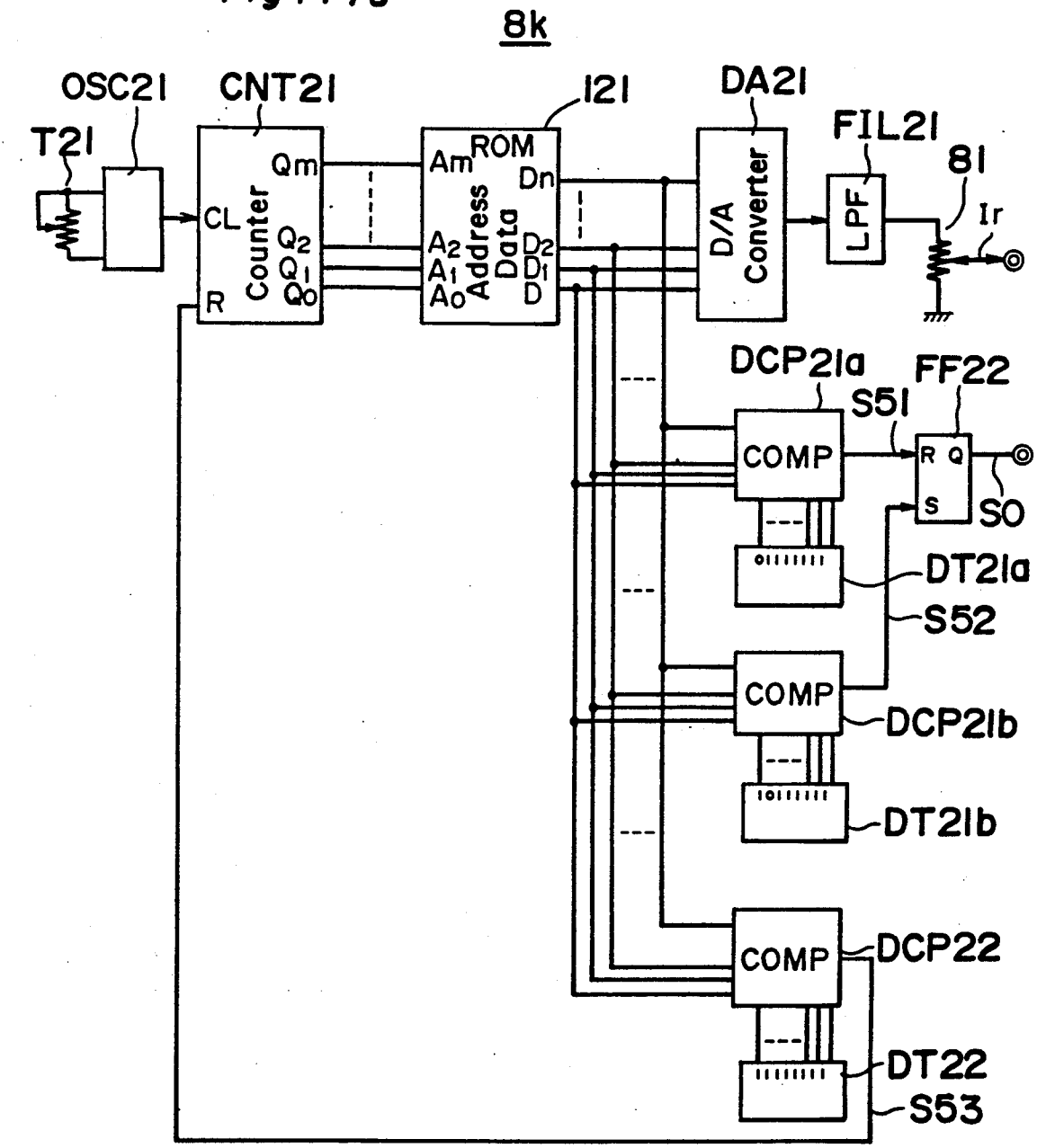
FIG. 14a is a schematic block diagram showing a reference signal generator 8k to be used for the power source of the preferred embodiments.

FIG. 14a is a schematic block diagram showing a reference signal generator 8k of another type to be used for the power source of the preferred embodiments. In FIG. 14a, the same components as those shown in FIGS. 12a and 13a are denoted by the same numerals as those shown in FIGS. 12a and 13a.

As compared with the reference signal generator 8i shown in FIG. 12a, in the reference signal generator 8k shown in FIG. 14a, there is provided three digital comparators DCP21a, DCP21b and DCP22, and three data setting circuits DT21a, DT21b and DT22, and an R-S type flip-flop FF22 in addition to the composition of the reference signal generator 8i shown in FIG. 12a. The reference signal generator 8k is characterized in that polarity control data for representing a timing when the polarity of the welding current Io is switched from the straight polarity to the reverse polarity are different from polarity control data for representing a timing when the polarity of the welding current Io is switched from the reverse polarity to the straight polarity, and these polarity control data are set in the data setting circuits DT21a and DT21b. It is to be noted that data for representing the end of one period are set in the data setting circuit DT22.

There is provided the digital comparators DCP21a and DCP21b respectively connected to the data setting circuits DT21a and DT21b, and the flip-flop FF22 which is reset by the high level signal outputted from the digital comparator DCP21a and is set by the high level signal outputted from the digital comparator DCP21b. The above-mentioned two polarity control data are stored in predetermined addresses of the ROM 121, and also the data for representing the end of one period are stored at a predetermined address of the ROM 121.

In order to detect the end of one period, there is provided the data setting circuit DT22 and the digital comparator DCP22. The output signal of the digital comparator DCP22 is outputted to the reset terminal R of the counter CNT21.

In a preferred embodiment of the reference signal generator 8k, the ROM 121 stores data of eight bits, and the data of the reference signal Ir range from "00000000" to "00111111". Data of "01111111" are stored at a predetermined address of the ROM 121 and are set in the data setting DT21a as the polarity control data for representing a timing of switching the polarity from the straight polarity to the reverse polarity. Data of "10111111" are stored at a predetermined address of the ROM 121 and are set in the data setting DT21b as the polarity control data for representing a timing of switching the polarity from the reverse polarity to the straight polarity. Data of "11111111" are stored at a predetermined address of the ROM 121 and are set in the data setting DT22 as the control data for representing a timing of the end of one period.

Figure 14B:
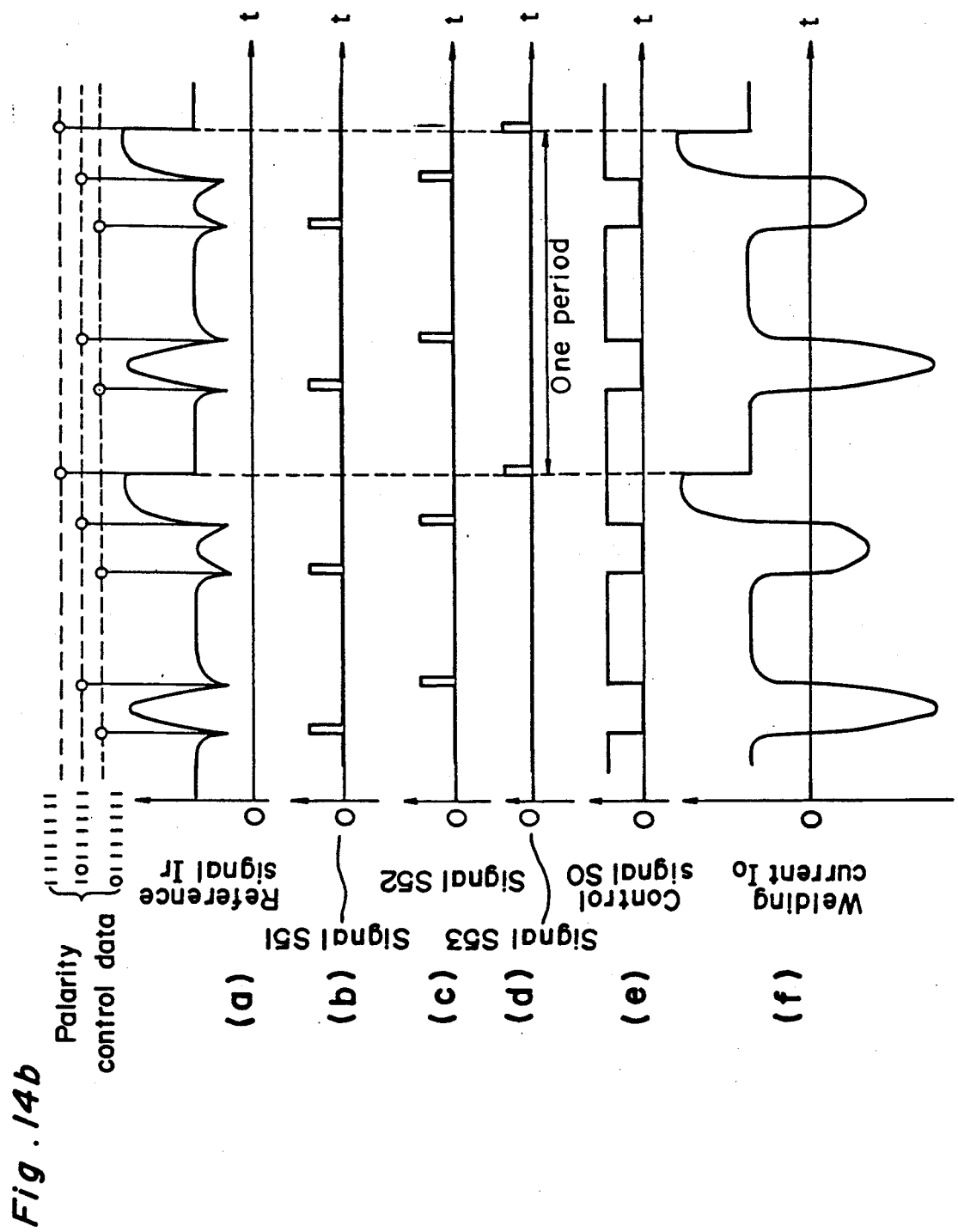
Figure 15:
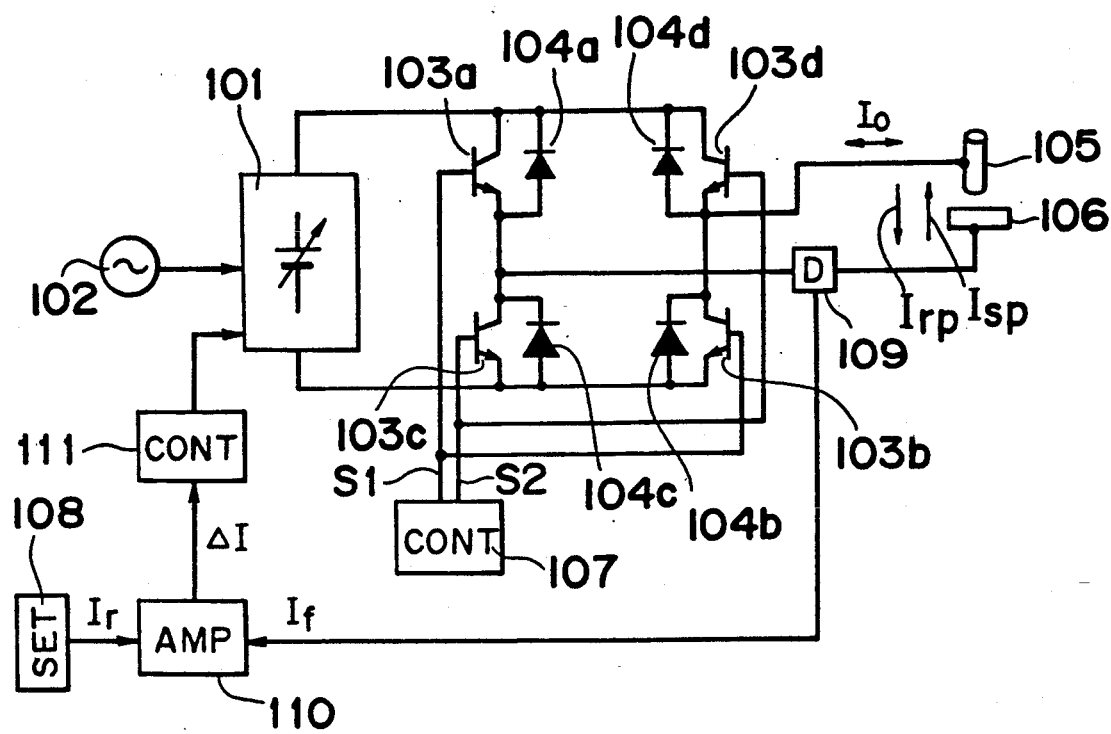
FIG. 15 is a schematic block diagram showing a conventional power source for an alternating-current arc welding.
Figure 16:
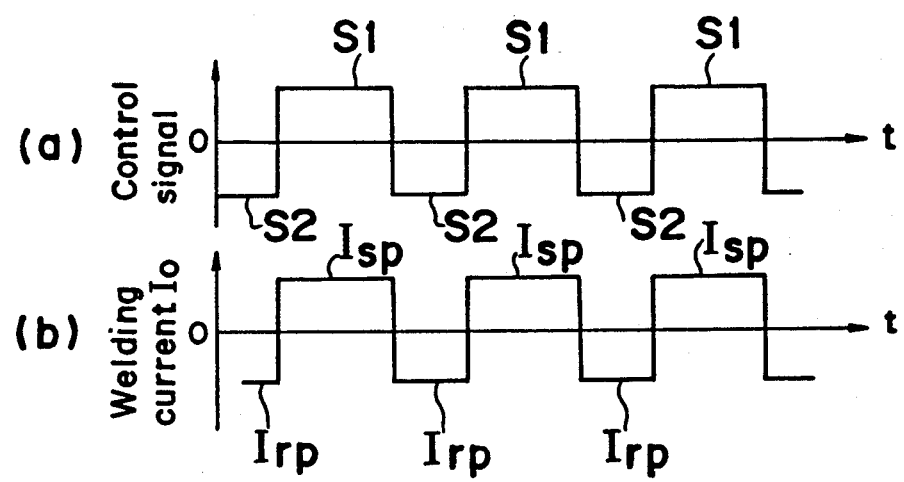
FIG. 16 is a timing chart of control signals S1 and S2 and a welding current Io shown in FIG. 15.

In this preferred embodiment, as described above, a timing when the polarity of the welding current Io is switched from the straight polarity to the reverse polarity, a timing when the polarity thereof is switched from the reverse polarity to the straight polarity and a timing of the end of one period thereof can be set at any time, respectively. As shown in FIG. 14b, the welding current Io having any waveform can be obtained.

In the reference signal generator 8k shown in FIG. 14a, the counter CNT21 is reset when the control data for representing the end of one period are read out from the ROM 121, there can be used any relationship between the bit number of the output terminals of the counter CNT21 and the number of the addresses of the ROM 121. Further, since the count value of the counter CNT21 until it is reset can be altered by changing the control data to be set in the data setting circuit DT22, there is such an advantage that there can be altered the precision of the data of the reference signal Ir stored in the ROM 121 and the period of the output voltage to be applied to the welding electrode 5 and the work 6 or the welding current Io.

It is to be noted that each of the data setting circuits for setting predetermined digital data used in the present preferred embodiments is preferably a digital dip switch.

In the first preferred embodiment, the controller 11 controls the direct-current power source 1 in response to the difference signal ΔI. However, the present invention is not limited to this, the controller 11 may control the direct-current power source 1 in response to the reference signal Ir.

In the second preferred embodiment, the controller 11a controls the invertor INV1 of the direct-current power source 1 in response to the difference signal ΔI. However, the present invention is not limited to this, the controller 11a may control the invertor INV1 of the direct-current power source 1 in response to the reference signal Ir.

In the present preferred embodiments, the direct-current power source 1 is a current source. However, the present invention is not limited to this, the direct-current power source 1 may be a voltage source.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A power source apparatus for supplying an alternating-current welding current to a welding load for an alternating-current arc welding, comprising:

reference signal generating means for periodically generating a reference signal of one period composed of a first signal for a first time interval corresponding to the straight polarity of said welding current and a second signal for a second time interval corresponding to the reverse polarity of said welding current, said first signal gradually increasing at the beginning of said first time interval and gradually decreasing at the end of said first time interval, said second signal gradually increasing at the beginning of said second time interval and gradually decreasing at the end of said second time interval;

current detecting means for detecting said welding current supplied to said welding load and outputting a detection signal corresponding to said detected welding current;

difference signal generating means for generating a difference signal corresponding to a difference between said reference signal and said detection signal, first rectifying means for rectifying an alternating-current outputted from an external alternating-current power source;

a pulse width modulator for generating control signals, each control signal having a width modulated in accordance with said difference signal;

a high frequency invertor for converting the output of said first rectifying means into a high frequency alternating-current in accordance with said control signal generated by said pulse width modulator;

a transformer for converting the high frequency alternating-current voltage outputted from said high frequency invertor into a predetermined voltage suitable for said alternating-current arc welding;

second rectifying means for rectifying said voltage outputted from said transformer and outputting said rectified voltage; and switching means for generating and outputting an alternating-current welding current to said welding load so as to sequentially change the polarity of said welding current gradually from a straight polarity to a reverse polarity and from the reverse polarity to the straight polarity in synchronization with said reference signal by switching said rectified voltage outputted from said second rectifying means in accordance with said reference signal.

2. The apparatus as claimed in claim 1, wherein said reference signal generating means comprises:

a bipolar signal generator for generating a bipolar signal periodically changing, said bipolar signal having a predetermined waveform;

a direct-current signal generator for generating a variable direct-current signal having either a straight polarity or a reverse polarity, said direct-current signal generator including an adjusting device for adjusting the level of said variable direct-current signal so as to adjust a ratio of a time interval of a positive polarity of said welding current to that of a negative polarity thereof;

an adder for adding said bipolar signal generated by said bipolar signal generator and said direct-current signal outputted from said direct-current signal generator, and outputting a signal of said addition result; and a rectifier circuit for full-wave rectifying said signal outputted from said adder and outputting a direct-current periodically changing as said reference signal.

3. The apparatus as claimed in claim 1, wherein said reference signal generating means comprises:

a bipolar signal generator for generating a bipolar signal periodically changing, said bipolar signal having a predetermined waveform;

a first direct-current signal generator for generating a variable direct-current signal having either a straight polarity or a reverse polarity, said first direct-current signal generator including an adjusting device for adjusting the level of said variable direct-current signal so as to adjust a ratio of a time interval of a straight polarity of said welding current to that of a reverse polarity thereof;

a first adder for adding said bipolar signal generated by said bipolar signal generator and said direct-current signal outputted from said first direct-current signal generator, and outputting a signal of said addition result;

a rectifier circuit for full-wave rectifying said signal outputted from said first adder;

a second direct-current signal generator for generating a variable direct-current signal said second direct-current signal generator including an adjusting device for adjusting the level of said variable direct-current signal so as to adjust the minimum value of said welding current; and a second adder for adding said full-wave rectified signal outputted from said rectifier circuit and said direct-current signal outputted from said second direct-current signal generator, and outputting a direct-current periodically changing as said reference signal.

4. The apparatus as claimed in claim 1, wherein said reference signal generating means comprises:

a bipolar signal generator for generating a bipolar signal periodically changing said bipolar signal having a predetermined waveform;

a first amplifier for amplifying the positive signal of said bipolar signal generated by said bipolar signal generator with a variable gain, said first amplifier including an adjusting device for adjusting said gain thereof;

a second amplifier for amplifying the negative signal of said bipolar signal generated by said bipolar signal generator with a variable gain, said second amplifier including another adjusting device for adjusting said gain thereof; and a third amplifier for adding the outputs of said first and second amplifiers with the same polarities as each other, amplifying said added signal and outputting an amplified signal as the reference signal, and a ratio of a time interval of a straight polarity of said welding current to that of a reverse polarity thereof is adjusted by adjusting said gains of said first and second amplifiers using said adjusting devices.

5. The apparatus as claimed in claim 1, wherein said reference signal generating means comprises:

a bipolar signal generator for generating a bipolar signal periodically changing, said bipolar signal having a predetermined waveform;

a first amplifier for amplifying the positive signal of said bipolar signal generated by said bipolar signal generator with a variable gain, said first amplifier including an adjusting device for adjusting said gain thereof;

a second amplifier for amplifying the negative signal of said bipolar signal outputted from said bipolar signal generator with a variable gain, said second amplifier including another adjusting device for adjusting said gain thereof;

a direct-current signal generator for generating a variable direct-current signal, said direct-current signal generator including an adjusting device for adjusting the level of said variable direct-current signal so as to adjust the minimum value of said welding current; and a third amplifier for adding the outputs of said first and second amplifiers and said direct-current signal generator with the same polarities as each other, amplifying said added signal and outputting an amplified signal as the reference signal, and a ratio of a time interval of a straight polarity of said welding current to that of a reverse polarity thereof is adjusted by adjusting said gains of said first and second amplifiers using said adjusting devices.

6. The apparatus as claimed in claim 1, wherein said reference signal generating means comprises:

a periodic signal generator for generating a periodic signal periodically changing, said periodic signal having a predetermined waveform; and an amplifier for amplifying said periodic signal generated by said periodic signal generator with a gain of:

(an average value of a rectangular wave signal when the waveform of said periodic signal is the rectangular wave signal)/(an average value of a periodic signal of any waveform having a peak value which is equal to the instantaneous value of the rectangular wave signal), and outputting the amplified signal as the reference signal.

7. The apparatus as claimed in claim 1, wherein said reference signal generating means comprises:

a periodic signal generator for generating a periodic signal periodically changing, said periodic signal having a predetermined waveform; and an amplifier for amplifying said periodic signal generated by said periodic signal generator with a gain of:

(an effective value of a rectangular wave signal when the waveform of said periodic signal is the rectangular wave signal)/(an effective value of a periodic signal of any waveform having a peak value which is equal to the instantaneous value of the rectangular wave signal), and outputting the amplified signal as the reference signal.

8. The apparatus as claimed in claim 1, wherein said reference signal generating means comprises:

a current detecting circuit for detecting an average value of said welding current to be supplied to said welding load and outputting a detection signal corresponding to said detected average value thereof;

a current setting means for setting an average value of a welding current to be set and outputting a setting signal corresponding to said average value thereof;

an error amplifier for subtracting said setting signal outputted from said current setting means from said detection signal outputted from said current detecting circuit and outputting a difference signal corresponding to a difference between these signals; and a signal generator for generating a periodic signal periodically changing, said periodic signal having a predetermined waveform and a peak value determined by said difference signal outputted from said error amplifier.

9. The apparatus as claimed in claim 1, wherein said reference signal generating means comprises:

a current detecting circuit for detecting an effective value of said welding current to be supplied to said welding load and outputting a detection signal corresponding to said detected effective value thereof;

a current setting means for setting an effective value of a welding current to be set and outputting a setting signal corresponding to said effective value thereof;

an error amplifier for subtracting said setting signal outputted from said current setting means from said detection signal outputted from said current detecting circuit and outputting a difference signal corresponding to a difference between these signals; and a signal generator for generating a periodic signal periodically changing, said periodic signal having a predetermined waveform and a peak value determined by said difference signal outputted from said error amplifier.

10. The apparatus as claimed in claim 1, wherein said reference signal generating means comprises:

storage means for storing a group of digital data of said reference signal;

reading means for reading a group of said digital data stored by said storage means sequentially in a predetermined order with a predetermined speed, repeatedly, a time interval from the beginning of reading a group of said digital data to the end thereof corresponding to one period of said welding current to be supplied to said welding load;

converting means for converting said digital data read by said reading means into an analogue signal; and low-pass filter means for rejecting a high frequency component of said analogue signal outputted from said converting means and outputting a filtered analogue signal as the reference signal to said direct-current power source means.

11. The apparatus as claimed in claim 10, wherein said reference signal generating means further comprises a speed adjusting device for adjusting said speed of said reading means so as to adjust the period of said welding current to be supplied to said welding load.

12. The apparatus as claimed in claim 10, wherein said storage means stores plural groups of digital data of said reference signals, and said reference signal generating means further comprises group selection means for selecting one group of said plural groups of digital data stored by said storage means.

13. The apparatus as claimed in claim 10, wherein a group of said digital data stored by said storage means includes at least one of data for representing switching of the polarity of said welding current, and data for representing the end of one period of said welding current.

14. The apparatus as claimed in claim 13, wherein said reading means comprises data judgment means for comparing said read digital data with preset data for representing switching of the polarity of said welding current, and outputting a polarity switching control signal to said switching circuit when said read digital data coincide with said preset data.

15. The apparatus as claimed in claim 13, wherein said reading means comprises data judgment means for comparing said read digital data with preset data for representing the end of one period of said welding current, and outputting a period completion reset signal when said read digital data coincide with said preset data.

16. The apparatus as claimed in claim 10, wherein the digital data stored in said storage means includes data for representing switching of the polarity of said welding current.

* * * * *

UNITED STATES PATENT AND TRADEMARK OFFICE
CERTIFICATE OF CORRECTION

PATENT NO. : 5,220,151
DATED : June 15, 1993
INVENTOR(S) : Kikuo Terayama, et al.

Page 1 of 2

It is certified that error appears in the above-indentified patent and that said Letters Patent is hereby corrected as shown below:

On the Title Page, Section [56], under FOREIGN PATENT DOCUMENTS: "219/127 PS" should read --219/137 PS--

Column 1, line 38: after "circuit" insert --.--

Column 4, line 52: delete "the positive signal of" and after "amplifying" insert --the positive signal of--

Column 4, line 56: delete "the negative signal of" and after "amplifying" insert --the negative signal of--

Column 5, line 7: delete "the positive signal of" and after "amplifying" insert --the positive signal of--

Column 5, line 11: delete "the negative signal of" and after "amplifying" insert --the negative signal of--

Column 8, line 26: after "current" insert --power--

Column 11, line 32: after "sufficiently" insert --higher than the switching frequency of the above-mentioned--

Column 12, line 28: "positive" should read --straight polarity of the--

UNITED STATES PATENT AND TRADEMARK OFFICE
CERTIFICATE OF CORRECTION

PATENT NO.  : 5,220,151
DATED       : June 15, 1993
INVENTOR(S) : Kikuo Terayama, et al.

It is certified that error appears in the above-indentified patent and that said Letters Patent is hereby corrected as shown below:

```
     Column 12, line 29:   "negative"  should read
--reverse polarity of the--
     Column 13, line 12:   "straight polarity of the"
should read --positive--
     Column 13, line 13:   "reverse polarity of the"
should read --negative--
     Column 17, line 57:   "DAI"  should read --DA1--
     Column 21, line 7:    "form"  should read --from--
     Column 25, line 25:   after "circuit" insert --.--
     Column 26, line 7:    after "CNT21" insert --.--
     Column 30, line 9, Claim 1:  "are"  should read
--arc--
     Column 31, line 12, Claim 3:  "claim 1"  should
read --claim 2--
```

Signed and Sealed this

Thirteenth Day of September, 1994

Attest:

BRUCE LEHMAN

*Attesting Officer*     *Commissioner of Patents and Trademarks*